United States Patent
Lee et al.

(10) Patent No.: US 12,015,997 B2
(45) Date of Patent: Jun. 18, 2024

(54) METHOD AND DEVICE FOR PERFORMING SIDELINK COMMUNICATION

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 17/436,975

(22) PCT Filed: Apr. 8, 2020

(86) PCT No.: PCT/KR2020/004756
§ 371 (c)(1),
(2) Date: Sep. 7, 2021

(87) PCT Pub. No.: WO2020/209603
PCT Pub. Date: Oct. 15, 2020

(65) Prior Publication Data
US 2022/0174646 A1  Jun. 2, 2022

Related U.S. Application Data

(60) Provisional application No. 62/831,639, filed on Apr. 9, 2019, provisional application No. 62/831,182, filed on Apr. 8, 2019.

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04L 5/0053* (2013.01); *H04W 72/0446* (2013.01); *H04W 72/20* (2023.01)

(58) Field of Classification Search
CPC . H04W 72/02; H04W 72/0446; H04W 72/20; H04W 76/14; H04W 92/18;
(Continued)

(56) References Cited

U.S. PATENT DOCUMENTS

2017/0230939 A1* 8/2017 Rudolf ................ H04L 12/1863
2018/0206260 A1* 7/2018 Khoryaev ............ H04W 72/56
2020/0228247 A1* 7/2020 Guo ..................... H04W 52/383

FOREIGN PATENT DOCUMENTS

WO  2017176099  10/2017
WO  2018004322  1/2018

OTHER PUBLICATIONS

ITL, Discussion on NR V2X Harq mechanism, R1-1901146, 3GPP TSG RAN WG1 Ad-Hoc Meeting 1901, Taipei, Taiwan, Jan. 11, 2019, see section 3, and figure 2.
(Continued)

*Primary Examiner* — Afshawn M Towfighi
(74) *Attorney, Agent, or Firm* — BRYAN CAVE LEIGHTON PAISNER LLP

(57) ABSTRACT

According to an embodiment of the present disclosure, a method for performing SL communication by a first device is provided. The method comprises the steps of: receiving information related to multiple resources from a second device; receiving, from the second device, a PSSCH and a PSCCH on a first resource among the multiple resources; on the basis of successful decoding of a transport block received through the PSSCH, determining, as a candidate resource for SL transmission by the first device, resources subsequent to the first resource among the multiple resources; and performing SL communication on the basis of the candidate resource for SL transmission by the first device.

13 Claims, 27 Drawing Sheets

(51) Int. Cl.
  *H04L 5/00* (2006.01)
  *H04W 72/0446* (2023.01)
  *H04W 72/20* (2023.01)

(58) Field of Classification Search
  CPC ............... H04L 1/1812; H04L 5/0053; H04L 2001/0093; H04L 1/1861; H04L 1/1893; H04L 1/1896; H04L 5/0044
  See application file for complete search history.

(56) References Cited

OTHER PUBLICATIONS

LG Electronics, Discussion on resource allocation mechanism for NR V2X, R1-1901933, 3GPP TSG RAN WG1 #96, Athens, Greece, Feb. 16, 2019, see section 2.2.

Fujitsu, Dynamic Sidelink Bi-mode Transmission in NR-V2X, R1-1901949, 3GPP TSG RAN WG1 #96, Athens, Greece, Feb. 15, 2019, see sections 2-3.

\* cited by examiner

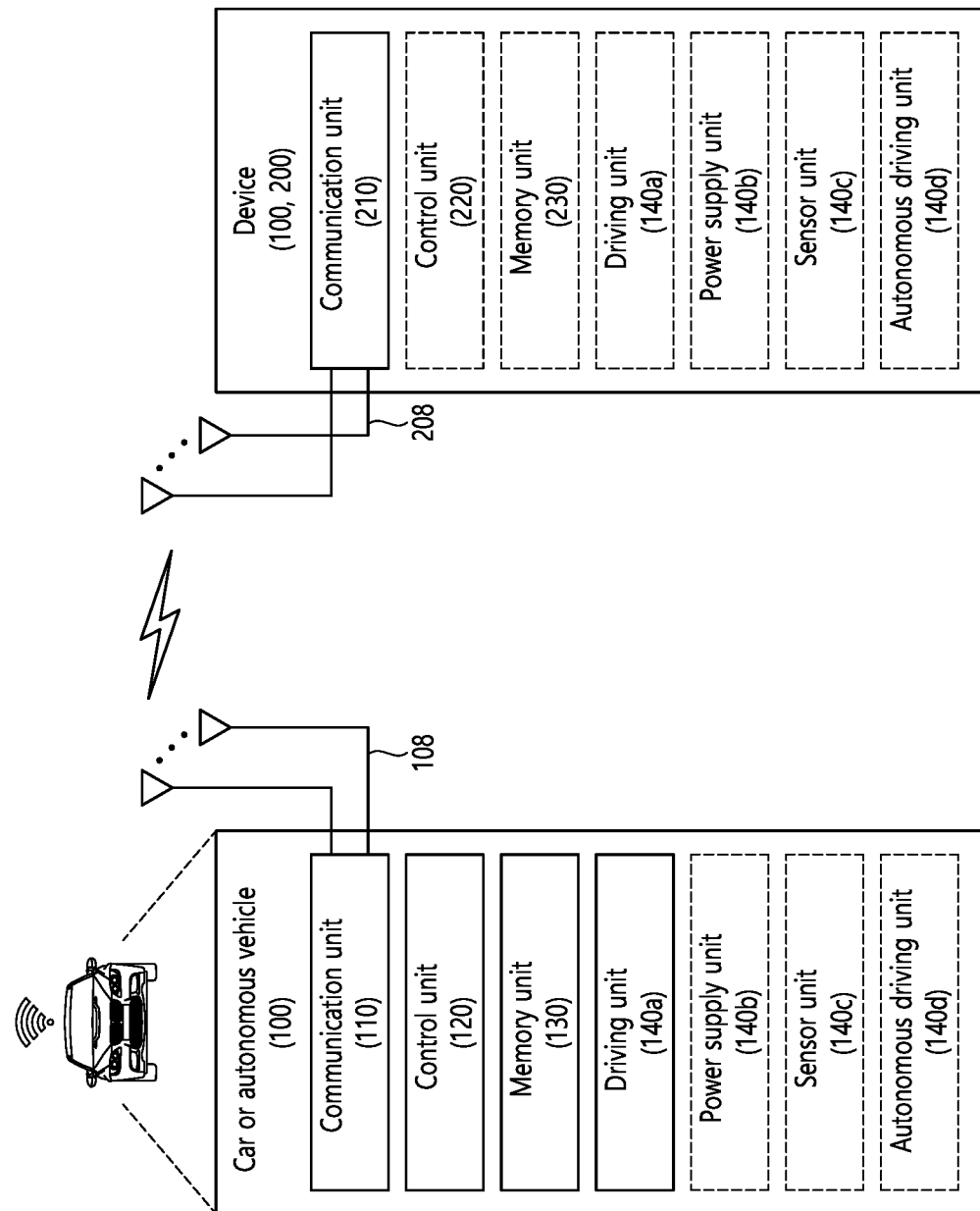

METHOD AND DEVICE FOR PERFORMING SIDELINK COMMUNICATION

This application is the National Stage filing under 35 U.S.C. 371 of International Application No. PCT/KR2020/004756 filed on Apr. 8, 2020, which claims priority to U.S. Provisional Application Nos. 62/831,182 filed on Apr. 8, 2019 and 62/831,639 filed on Apr. 9, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

A technical problem of the present disclosure is to provide a method for sidelink (SL) communication between apparatuses (or terminals) based on V2X communication, and the apparatuses (or terminals) performing the method.

Another technical problem of the present disclosure is to provide a method for efficiently using, by a receiving terminal, a retransmission resource reserved by a transmitting terminal, and an apparatus (or terminal) for performing the same.

According to an embodiment of the present disclosure, a method for performing sidelink (SL) communication by a first apparatus may be provided. The method may include receiving information related to a plurality of resources from a second apparatus, receiving a physical sidelink share channel (PSSCH) and a physical sidelink control channel (PSCCH) from the second apparatus on a first resource among the plurality of resources, determining resources after the first resource among the plurality of resources as a candidate resource for SL transmission of the first apparatus based on a successful decoding of a transport block received through the PSSCH and performing SL communication based on the candidate resource for the SL transmission of the first apparatus.

According to an embodiment of the present disclosure, a first apparatus for performing sidelink (SL) communication may be provided. The first apparatus includes at least one memory storing instructions, at least one transceiver and at least one processor connecting the at least one memory and the at least one transceiver, wherein the at least one processor is configured to: control the at least one transceiver to receive information related to a plurality of resources from a second apparatus, control the at least one transceiver to receive a physical sidelink share channel (PSSCH) and a physical sidelink control channel (PSCCH) from the second apparatus on a first resource among the plurality of resources, determine resources after the first resource among the plurality of resources as a candidate resource for SL transmission of the first apparatus based on a successful decoding of a transport block received through the PSSCH, and perform SL communication based on the candidate resource for the SL transmission of the first apparatus.

According to an embodiment of the present disclosure, an apparatus (or chip(set)) controlling a first terminal may be provided. The apparatus includes at least one processor and at least one computer memory that is executably connected by the at least one processor and stores instructions, wherein, by the at least one processor executing the instructions, the first terminal: receive information related to a plurality of resources from a second terminal, receive a physical sidelink share channel (PSSCH) and a physical sidelink control channel (PSCCH) from the second terminal on a first resource among the plurality of resources, determine resources after the first resource among the plurality of resources as a candidate resource for SL transmission of the first terminal based on a successful decoding of a transport block received through the PSSCH, and perform SL communication based on the candidate resource for the SL transmission of the first terminal.

According to an embodiment of the present disclosure, a non-transitory computer-readable storage medium having instructions stored thereon may be provided. Based on the instructions being executed by at least one processor: information related to a plurality of resources is received by a first apparatus from a second apparatus, a physical sidelink share channel (PSSCH) and a physical sidelink control channel (PSCCH) are received by the first apparatus from the second apparatus on a first resource among the plurality of resources, resources after the first resource among the plurality of resources are determined by the first apparatus as a candidate resource for SL transmission of the first apparatus based on a successful decoding of a transport block received through the PSSCH, and SL communication is performed by the first apparatus based on the candidate resource for the SL transmission of the first apparatus.

According to an embodiment of the present disclosure, a method for performing sidelink (SL) communication by a third apparatus may be provided. The method includes: receiving information on a plurality of resources from a second apparatus, determining whether a decoding of the transport block for the PSSCH by a fourth apparatus is successful based on a physical sidelink feedback channel (PSFCH) related to the PSSCH transmitted from the second apparatus to the fourth apparatus on a first resource among the plurality of resources, determining whether to use resources after the first resource among the plurality of resources as a candidate resource for SL transmission of the third apparatus based on whether the decoding by the fourth apparatus is successful and performing SL communication based on the determination related to whether to use the resources after the first resource as the candidate resource for the SL transmission of the third apparatus.

According to an embodiment of the present disclosure, a third apparatus for performing sidelink (SL) communication may be provided. The third apparatus includes at least one memory storing instructions, at least one transceiver and at least one processor connecting the at least one memory and the at least one transceiver, wherein the at least one processor is configured to: control the at least one transceiver to receive information on a plurality of resources from a second apparatus, determine whether a decoding of the transport block for the PSSCH by a fourth apparatus is successful based on a physical sidelink feedback channel (PSFCH) related to the PSSCH transmitted from the second apparatus to the fourth apparatus on a first resource among the plurality of resources, determine whether to use resources after the first resource among the plurality of resources as a candidate resource for SL transmission of the third apparatus based on whether the decoding by the fourth apparatus is successful, and perform SL communication based on the determination related to whether to use the resources after the first resource as the candidate resource for the SL transmission of the third apparatus.

According to an embodiment of the present disclosure, V2X communication between apparatuses (or terminals) may be performed effectively.

According to an embodiment of the present disclosure, a transmission power of a PSSCH and/or a PSCCH may be managed efficiently.

BRIEF DESCRIPTION OF THE DRAWINGS

FIG. 22 shows a car or an autonomous vehicle, in accordance with an embodiment of the present disclosure.

DESCRIPTION OF EXEMPLARY EMBODIMENTS

Figure 1:
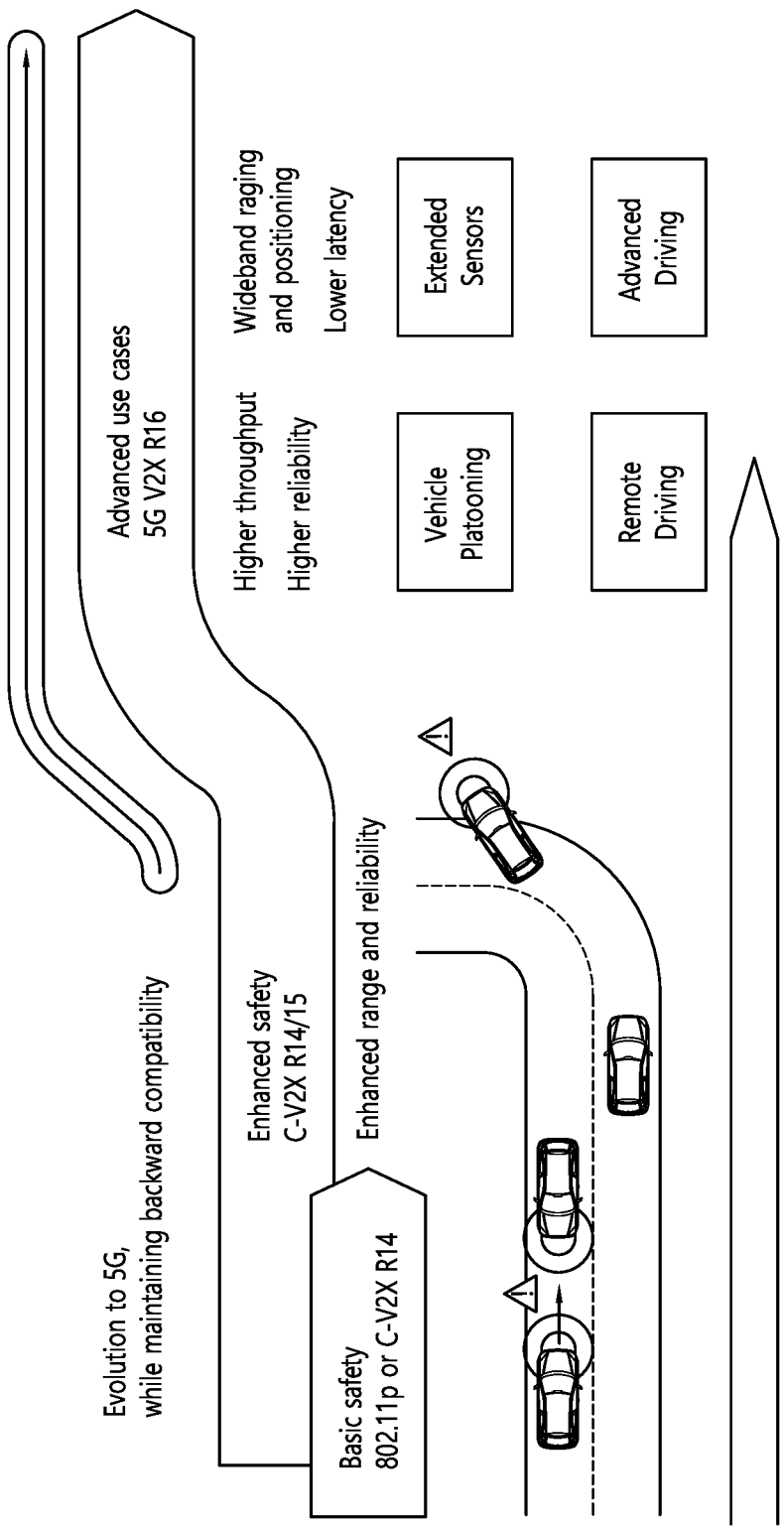
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
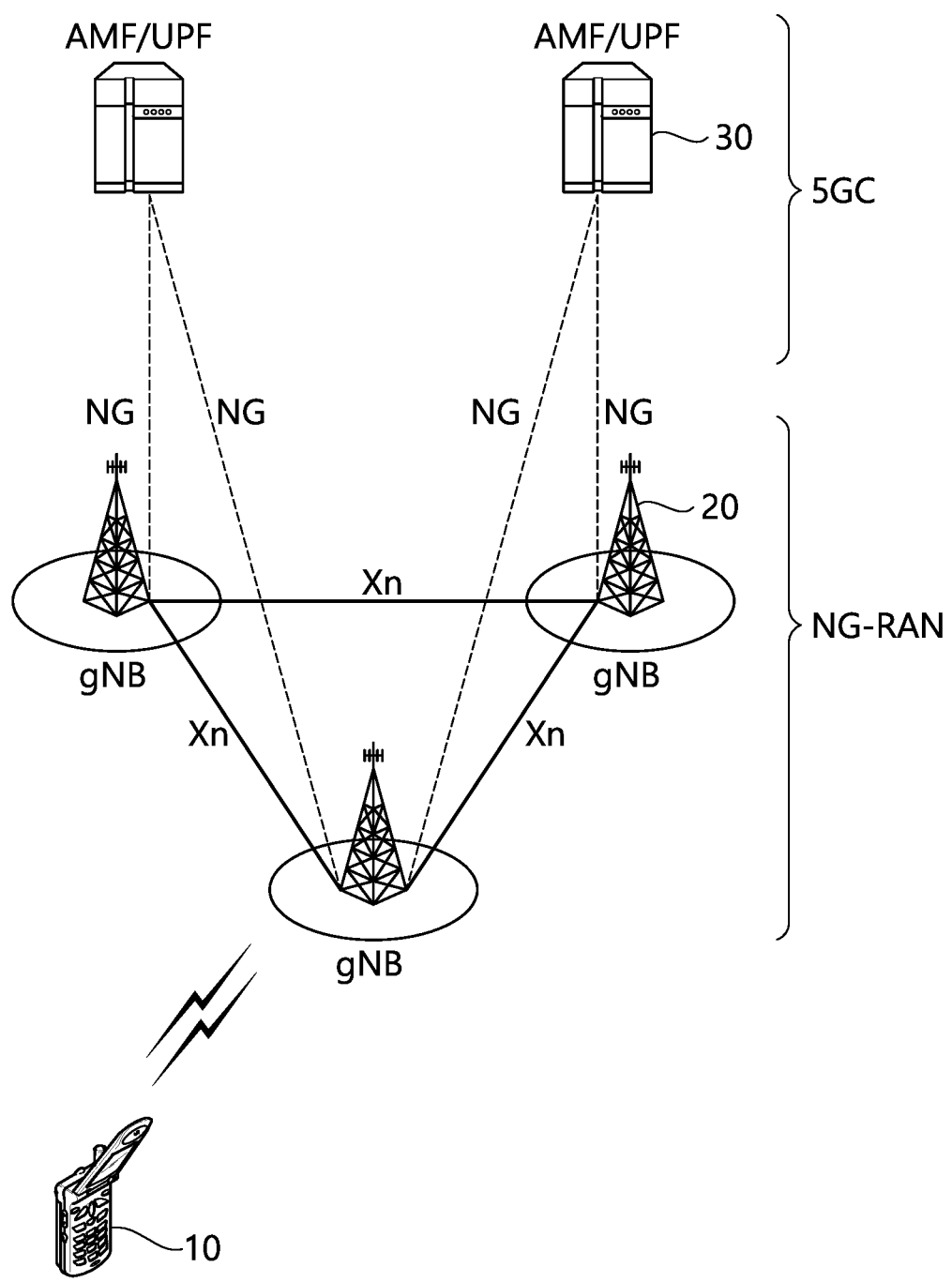
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
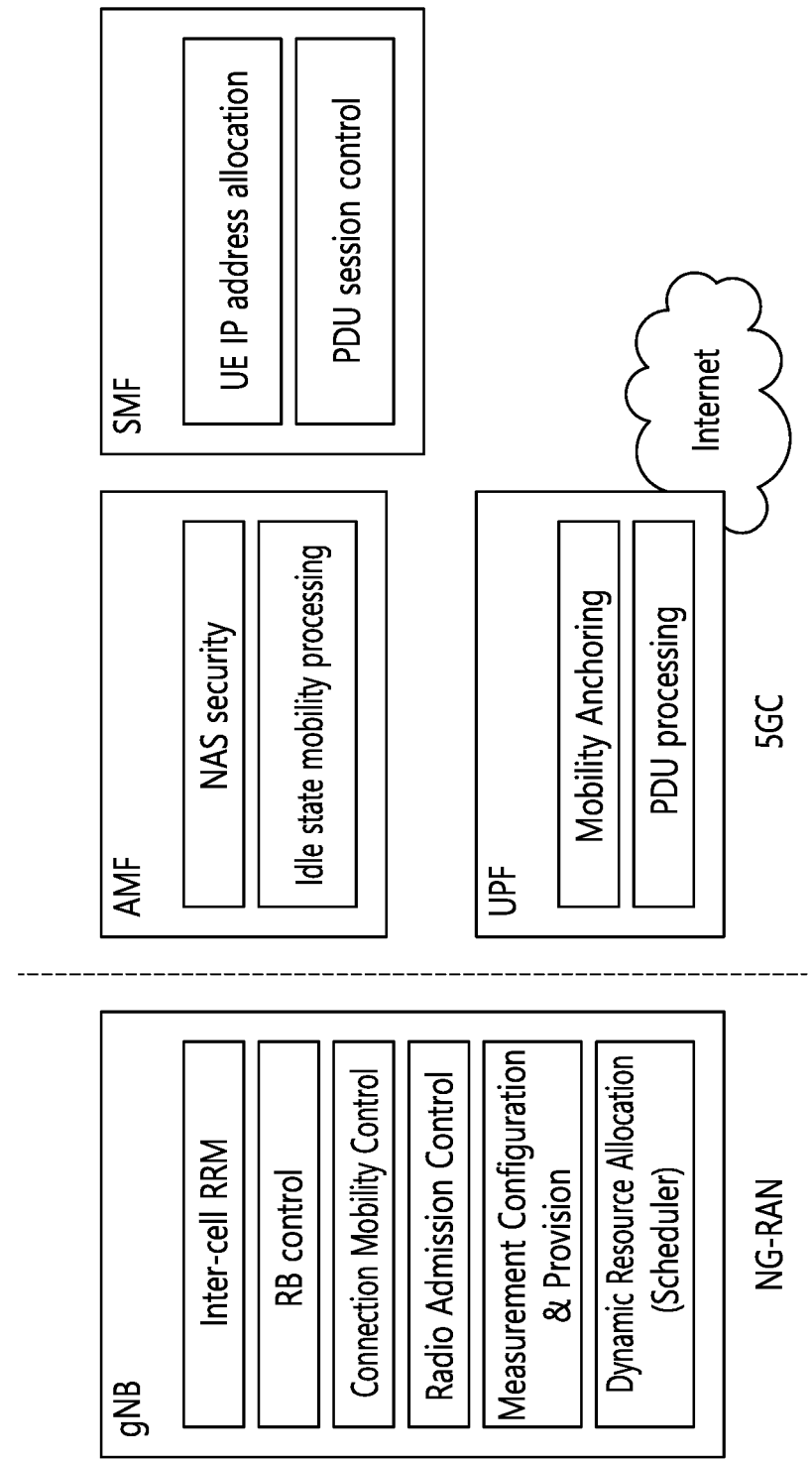
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
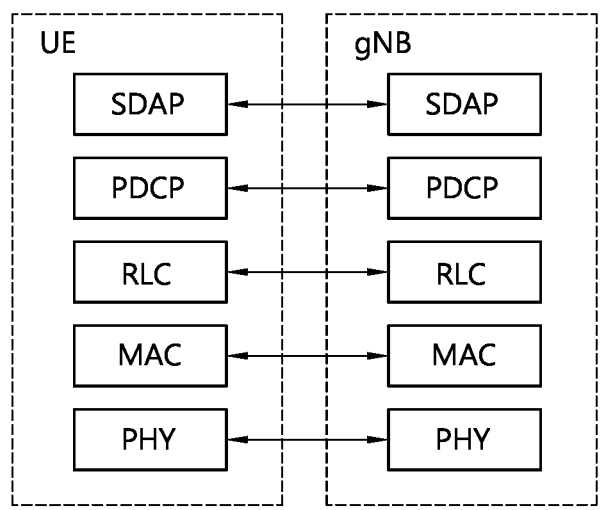
FIG. 4A and FIG. 4B show a radio protocol architecture, in accordance with an embodiment of the present disclosure.
Figure 4B:
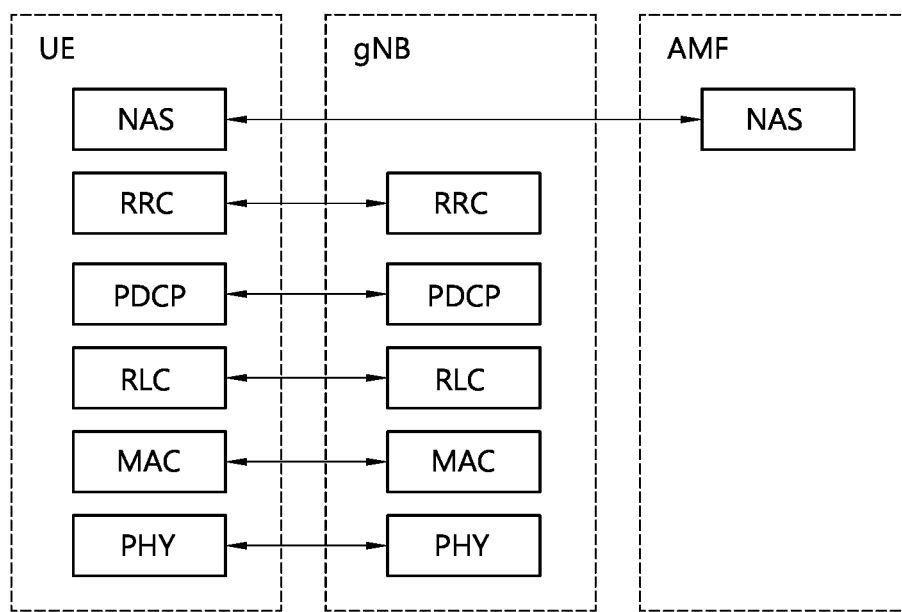

FIG. 4A and FIG. 4B show a radio protocol architecture, in accordance with an embodiment of the present disclosure. The embodiment of FIG. 4A and FIG. 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIG. 4A and FIG. 4B, a physical layer provides an upper layer with an information transfer service through a physical channel. The physical layer is connected to a medium access control (MAC) layer which is an upper layer of the physical layer through a transport channel Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel A transmission time interval (TTI) is a unit time of subframe transmission.

Figure 5:
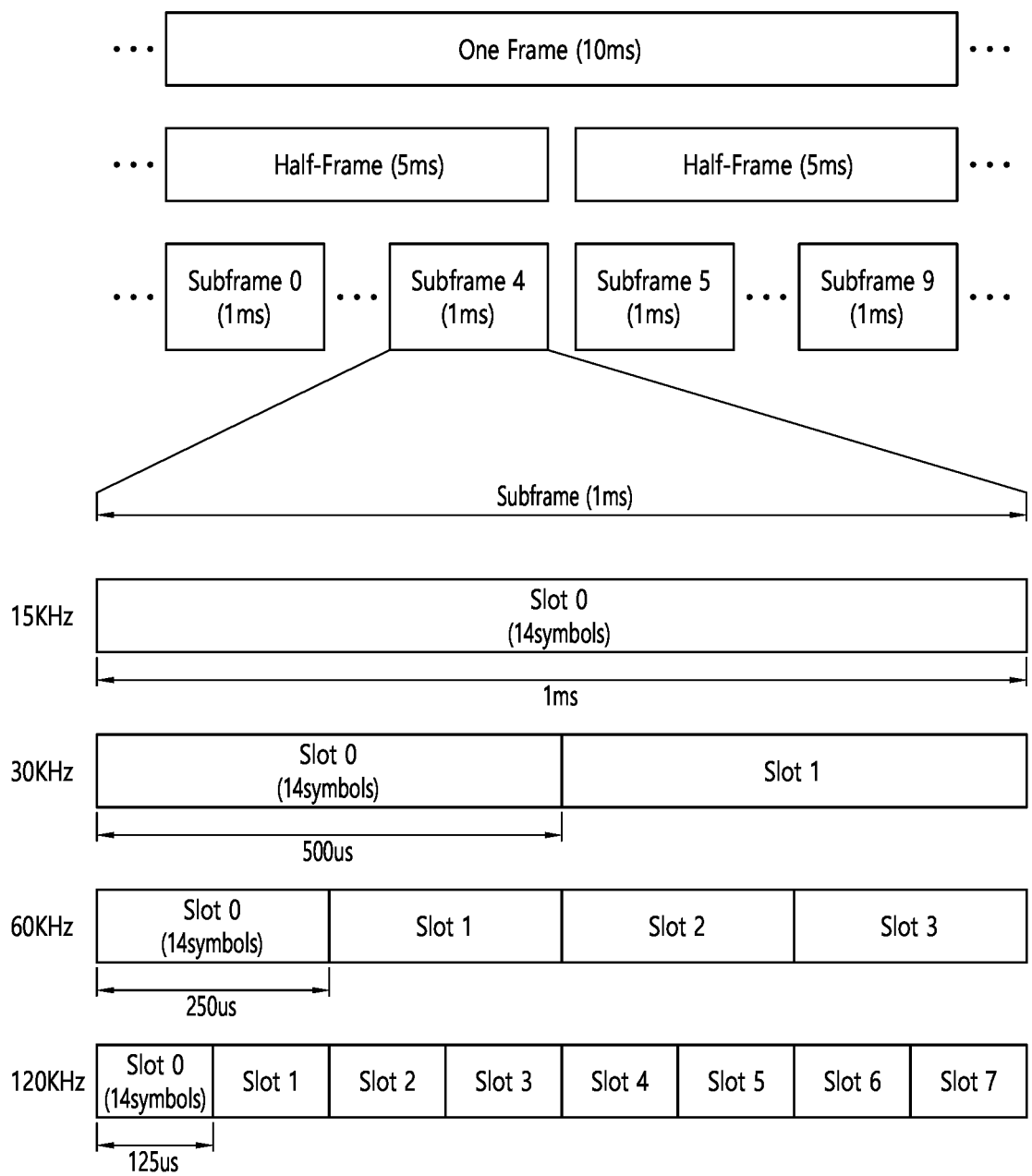
FIG. 5 shows a structure of a wireless frame of an NR, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
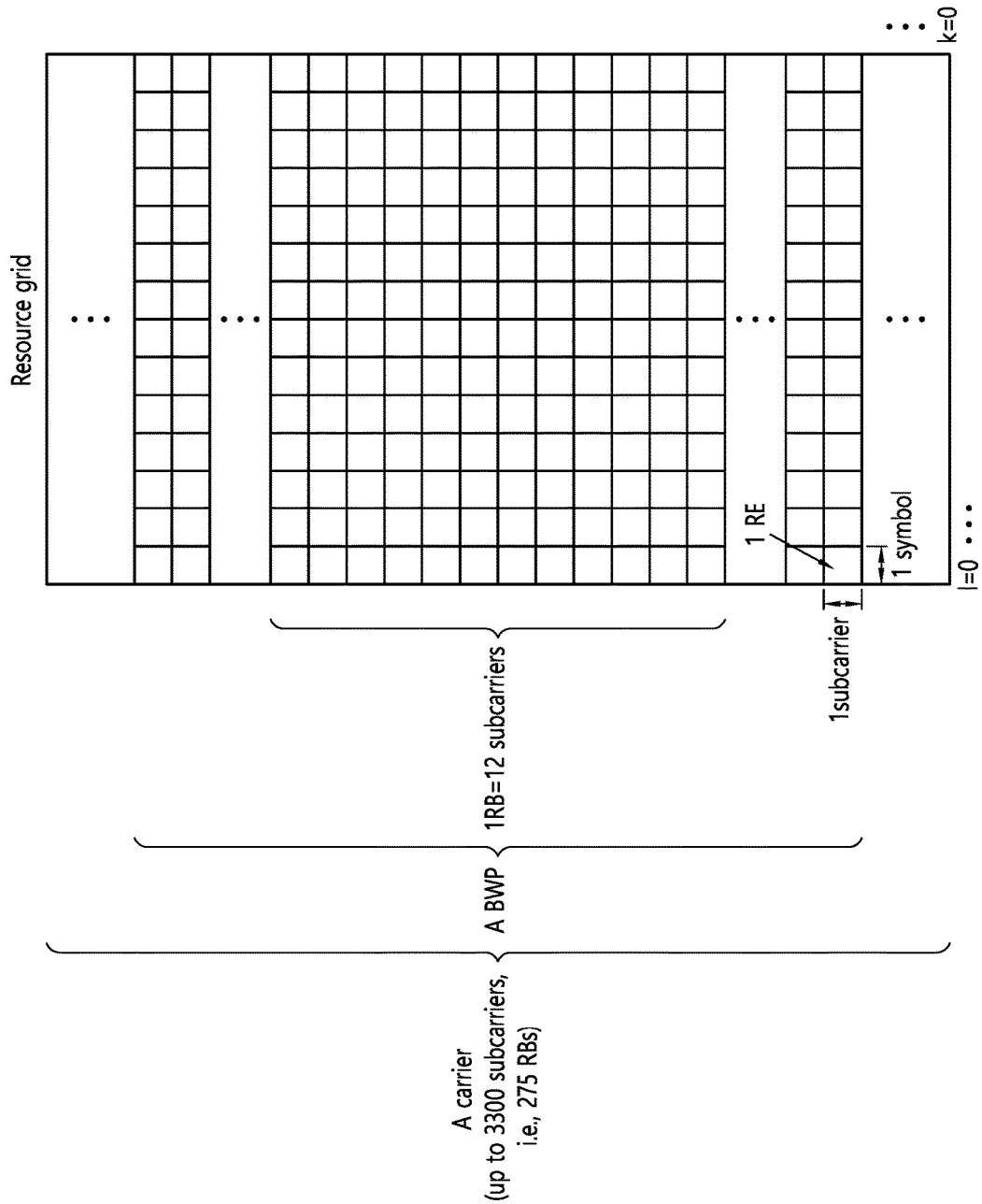
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
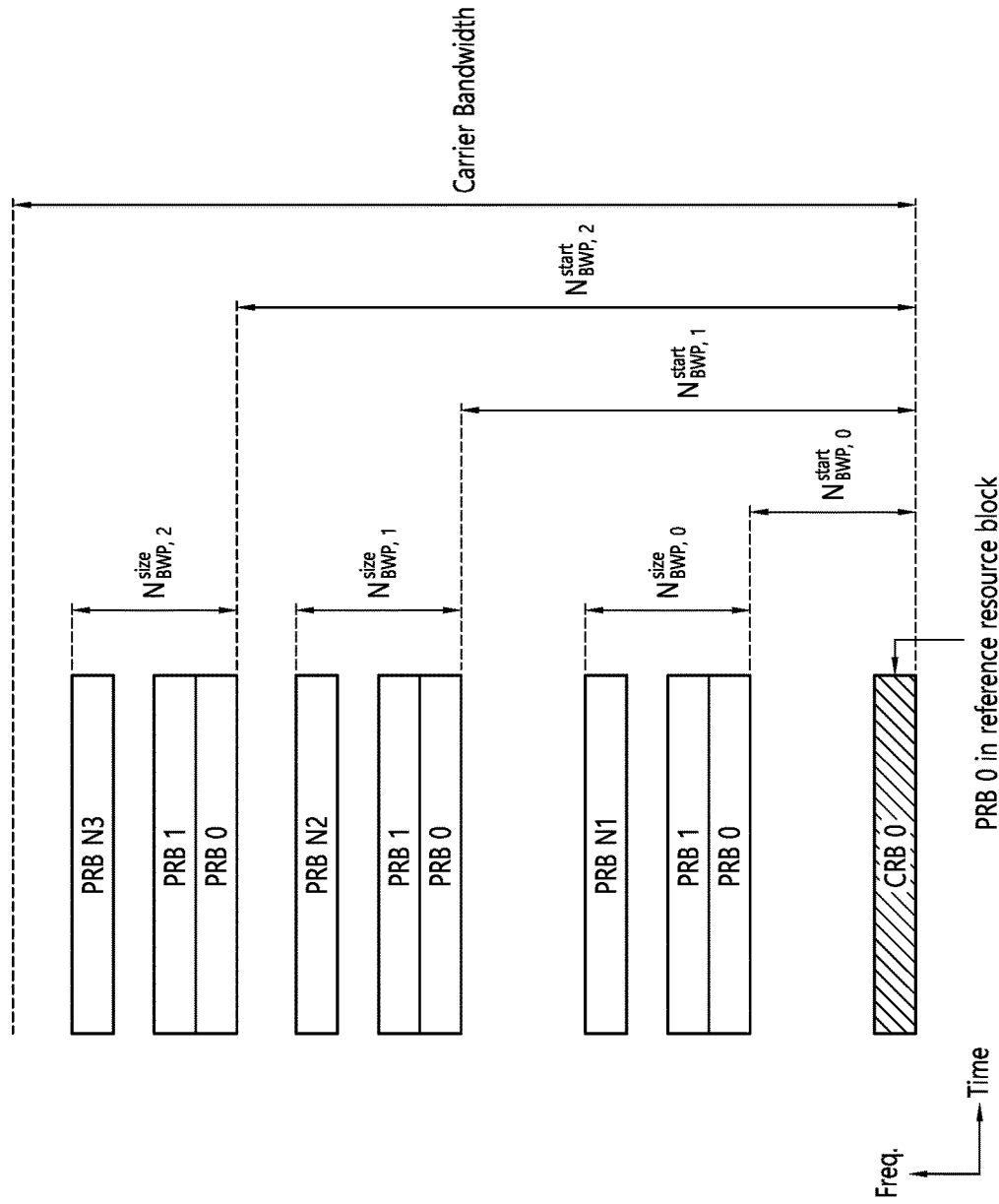
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
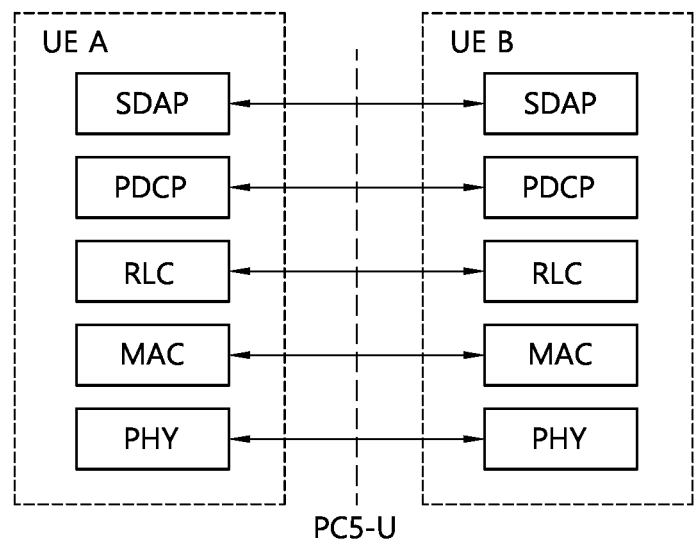
FIG. 8A and FIG. 8B show a radio protocol architecture for a SL communication, in accordance with an embodiment of the present disclosure.
Figure 8B:
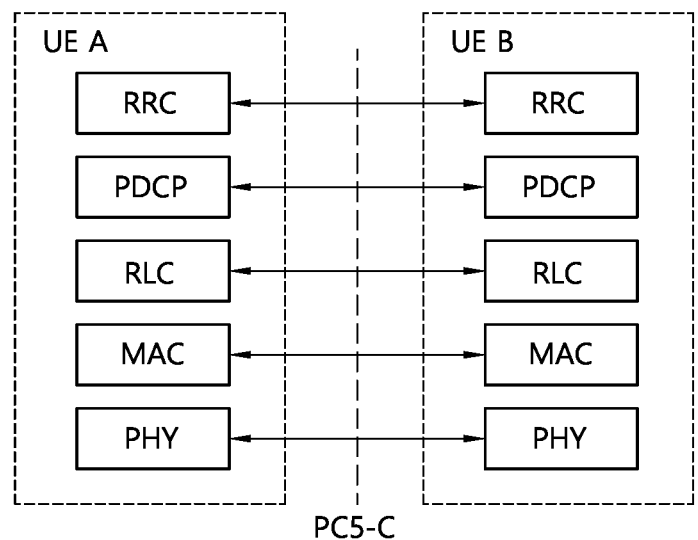

FIG. 8A and FIG. 8B show a radio protocol architecture for a SL communication, in accordance with an embodiment of the present disclosure. The embodiment of FIG. 8A and FIG. 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
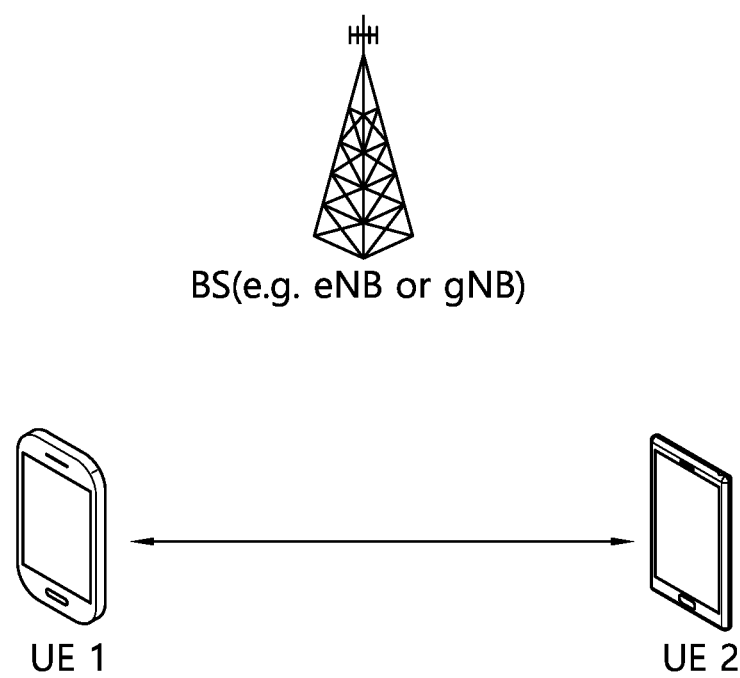
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
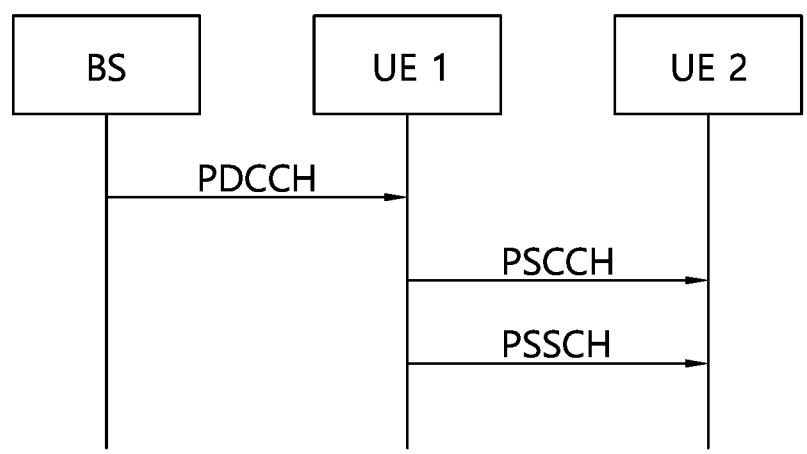
FIG. 10A and FIG. 10B show a procedure of performing V2X or SL communication by a UE based on a transmission mode, in accordance with an embodiment of the present disclosure.
Figure 10B:
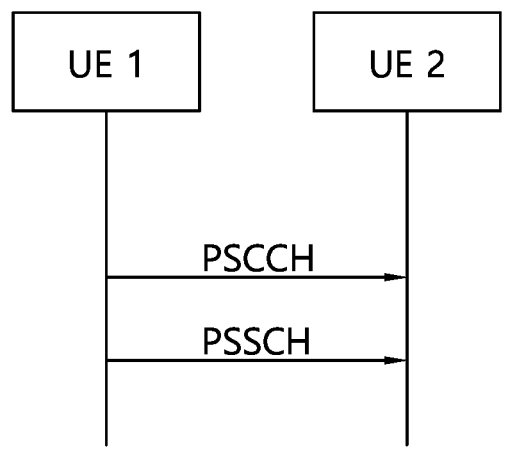

FIG. 10A and FIG. 10B show a procedure of performing V2X or SL communication by a UE based on a transmission mode, in accordance with an embodiment of the present disclosure. The embodiment of FIG. 10A and FIG. 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
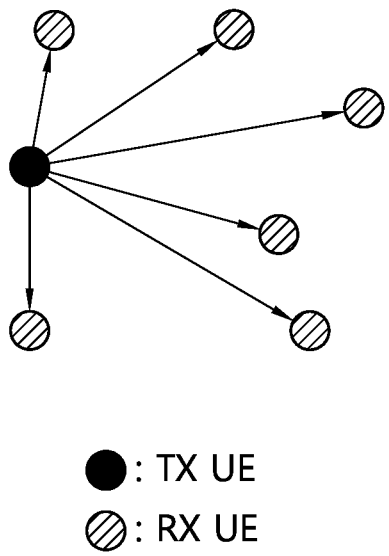
FIG. 11A through FIG. 11C show three cast types, in accordance with an embodiment of the present disclosure.
Figure 11B:
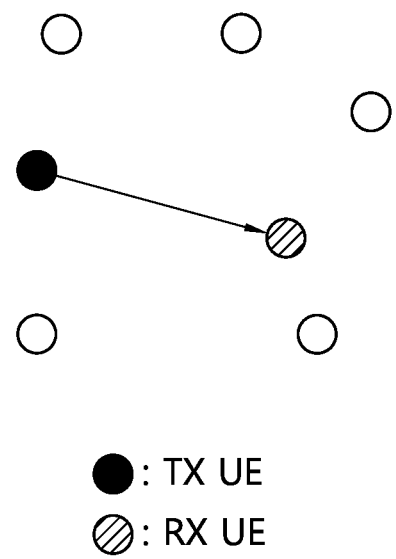
Figure 11C:
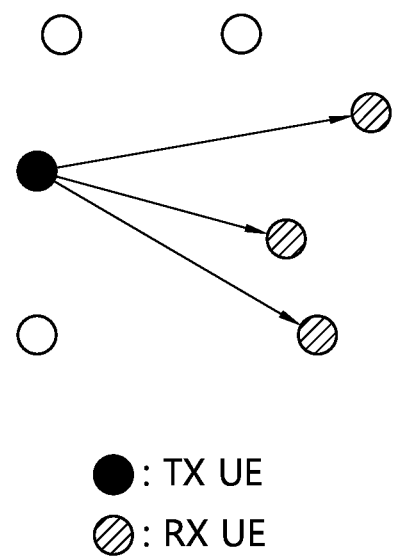

FIG. 11A through FIG. 11C show three cast types, in accordance with an embodiment of the present disclosure. The embodiment of FIG. 11A through FIG. 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, etc.) or V2X communication but also to sidelink communication or V2X communication based on a Uu interface (e.g., PUSCH, PDSCH, PDCCH, PUCCH, etc.).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or a WAN DL signal (e.g., PDCCH, PDSCH, PSS/SSS, etc.). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS. etc.). The transmitting operation of the UE may include a transmitting operation of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

In the present disclosure, the "transmitting terminal" may be interpreted as a terminal performing DATA transmission (eg, PSCCH/PSSCH transmission) (to (target) receiving terminal) and/or a terminal intend to use potential retransmission resources of other terminals for its data transmission purpose. And, in the present disclosure, the "receiving terminal" may be interpreted as a terminal transmitting a HARQ feedback (to the corresponding transmitting terminal) according to whether the decoding of the data received from the transmitting terminal succeeds (and/or whether detection/succeed of the decoding (related to PSSCH scheduling) transmitted from the transmitting terminal) and/or a terminal performing it's own data transmission (to the corresponding transmitting terminal) and/or a terminal overhearing a HARQ feedback transmitted from another terminal (which has received data transmitted from the transmitting terminal). For example, the receiving terminal may be interpreted as a terminal transmitting a HARQ feedback according to whether the decoding of the data received from the transmitting terminal is successful and/or a terminal transmitting its own data to the corresponding transmitting terminal and/or a terminal overhearing HARQ feedback transmitted from another terminal and/or a terminal intending to use the potential retransmission resource of the another terminal for its own data transmission purpose. In an example, "PSCCH" may be interpreted excessively to "SCI".

Meanwhile, in an example, when the transmitting terminal performs the initial transmission related to the packet (eg, it may be interpreted as a kind of transpot block (TB)), considering the possibility of packet decoding failure of the (target) receiving terminal, (preconfigured) (maximum (or minimum or average)) allowable (retransmission resource or retransmission) number (or, (for example, AL PRETX) of) potential retransmission resources (P_RETXRSC) may be reserved in advance, and information on the potential retransmission resource (eg, (time/frequency) resource number/location information) may be informed through a predefined channel (eg, PSCCH related to the initial transmission). In more specific example, when the transmitting terminal performs an initial transmission related to the packet, considering the possibility of packet decoding failure of the receiving terminal, the potential retransmission resource may be reserved in advance, and information on the potential retransmission resource may be informed through the predefined channel.

In an example, when such a rule is applied, the potential retransmission resource-related information may be shared with other nearby terminals in advance (from the time of performing initial transmission), thereby mitigating the transmission resource selection conflict problem. On the other hand, in an example, when (HARQ) ACK (eg, an indicator that packet decoding is successful) is received from the (target) receiving terminal, a problem in which some potential retransmission resources reserved in advance are wasted may occur. Therefore, a method for alleviating the problem that some potential retransmission resources are wasted needs to be proposed. Hereinafter, a method for receiving terminal to determine whether to use a resource reserved by a transmitting terminal for data transmission, and an apparatus supporting the same, according to an embodiment of the present disclosure will be described. The plurality of embodiments below are not mutually exclusive, and at least one or more of the embodiments may be combined with each other.

Various embodiments of the present disclosure may be applied to unicast communication as shown in FIG. 11B or may be applied to groupcast communication as shown in FIG. 11C. In one example, the "transmitting terminal" of the present disclosure may be the transmitting terminal of unicast communication of FIG. 11B or the transmitting terminal of groupcast communication of FIG. 11C. In one example, the "receiving terminal" of the present disclosure may be the receiving terminal of the unicast communication of FIG. 11B, the target receiving terminal of the groupcast communication of FIG. 11C, and the non-target receiving terminal of the groupcast communication of FIG. 11C. For example, the non-target receiving terminal may not transmit HARQ ACK and/or HARQ NACK to the transmitting terminal.

According to an embodiment of the present disclosure, when the receiving terminal transmits HARQ ACK to the transmitting terminal, the receiving terminal may use potential retransmission resources (at a later time point) reserved by the transmitting terminal for its data transmission purpose. For example, when the receiving terminal transmits HARQ ACK to the transmitting terminal, the receiving terminal may determine that the potential retransmission resources reserved by the transmitting terminal (at a later time point) may be used (preferentially) for the data transmission purpose of the receiving terminal. Here, as an example, it may be interpreted that the receiving terminal includes the potential retransmission resources as a selectable/reservable candidate resource for (own) PSCCH/PSSCH transmission. For example, when the receiving terminal transmits HARQ ACK to the transmitting terminal, the receiving terminal may include the potential retransmission resources as a selectable/reservable candidate resource for (own) PSCCH/PSSCH transmission.

On the other hand, when the receiving terminal transmits HARQ NACK (eg, an indicator that packet decoding has failed) to the transmitting terminal, the receiving terminal may not use the potential retransmission resources (at a later time) reserved by the transmitting terminal for its own data transmission purpose. That is, the receiving terminal may not use the potential retransmission resources (at a later time point) reserved by the transmitting terminal for its own data transmission purpose. It may be interpreted as, for example, that the receiving terminal exclude the potential retransmission resources from the selectable/reservable candidate resource for its own PSCCH/PSSCH transmission. For example, when the RX UE transmits a NACK to the TX UE, the RX UE may exclude P_RETXRSC from a selectable/reservable candidate resource for (own) PSCCH/PSSCH transmission.

In an example, the above embodiment may be limitedly applied only when it is clear for the receiving terminal perception that it is the target receiving terminal (or the only receiving terminal), such as a unicast of FIG. 11B.

According to an embodiment of the present disclosure, as in groupcast of FIG. 11C, when a plurality of (target) receiving terminals receive a (specific) packet sent by a transmitting terminal, and a plurality of (target) receiving terminals transmit HARQ feedback by using the FDMed and/or CDMed HARQ feedback resource, it is unable to know from the receiving terminal's perspective that another receiving terminal has transmitted which HARQ feedback (eg, HARQ ACK or NACK). For example, according to HALF DUPLEX problem, as the specific receiving terminal may not receive (or transmit) PSFCH at the same time as transmitting (or receiving) the PSFCH, the specific receiving terminal may not know which HARQ feedback (eg, ACK or NACK) that other receiving terminals have transmitted. Therefore, as an example, in this case, the (corresponding) receiving terminal may not use the potential retransmission resources (at a later time point) reserved by the transmitting terminal (even if it has transmitted ACK) for its own DATA transmission purpose. For example, even if the receiving terminal transmits the HARQ ACK, the receiving terminal may not use the potential retransmission resources reserved by the transmitting terminal (at a later time) for the purpose of data transmission of the receiving terminal.

In an example, the above embodiment may be limitedly applied only when the receiving terminal is configured to transmit all HARQ ACK/NACK information for packet reception in groupcast such as FIG. 11C.

According to an embodiment of the present disclosure, when the receiving terminal is configured to transmit only HARQ NACK information for packet reception in groupcast, if it is determined (or decided) that a specific receiving terminal does not perform HARQ NACK transmission, and other (target) RX UE in groupcast does not perform HARQ NACK transmission, it may be determined by the corresponding receiving terminal that the potential retransmission resources (after a timepoint) reserved by the transmitting terminal is available (preferentially) for its own data transmission purpose. In an example, if the energy/power measured on the HARQ feedback resource is greater than a preconfigured threshold and/or if the power/energy for the related PSFCH sequence on the HARQ feedback resource is greater than a preconfigured threshold, it may be determined that (another receiving terminal) has transmitted the HARQ NACK. In an example, the (corresponding) receiving terminal may determine that the potential retransmission resources reserved by the transmitting terminal (at a later time) may be used for data transmission of the receiving terminal (preferentially).

On the other hand, as an example, if it is determined that a specific receiving terminal performs HARQ NACK transmission, or other (target) receiving terminal (in GROUPCAST) performs HARQ NACK transmission, it is possible to make (corresponding) receiving terminal not to use the potential retransmission resources (after a timepoint) reserved by the transmitting terminal for its own data transmission purpose. For example, the (corresponding) receiving terminal may not use potential retransmission resources reserved by the transmitting terminal (at a later time point) for data transmission of the receiving terminal.

In other words, as an example, it may be interpreted that the applying proposed rules may be configured differently according to the HARQ feedback method (eg, NACK ONLY feedback, ACK/NACK feedback).

According to an embodiment of the present disclosure, whether reservation of the potential retransmission resources of the transmitting terminal in the described embodiments is allowed (and/or whether the receiving terminal can use the potential retransmission resources of the transmitting terminal for its data transmission purpose and/or (whether) OVERHEARING (is allowed) for the HARQ feedback transmitted by another terminal of the receiving terminal and/or the value of maximum (or minimum or average) allowed retransmission (resource) number and/or whether (some) proposed rules are applied and/or types of the applied proposed rules) may be configured differently according to congestion level and/or SL (channel) quality (eg, SL CSI, SL RSRP/RSRQ/RSSI) and/or service type (and/or priority) and/or QOS parameter for the service (and/or requirement) (eg, reliability, latency, priority) and/or cast type (eg, unicast, groupcast, broadcast), and/or HARQ feedback method (eg, NACK only feedback, ACK/NACK feedback), etc. For example, whether the reservation of the potential retransmission resources of the transmitting terminal in the described embodiments is allowed may be configured differently according to congestion level and/or SL (channel) quality and/or service type and/or QOS parameter related to a service (and/or requirement), latency, priority and/or cast type.

In an example, when the congestion level (and/or SL RSSI) is higher than the preconfigured threshold (and/or when SL RSRP/RSRQ (and/or service priority) is lower than a preconfigured threshold), it may be configured for the potential retransmission resources reserving operation of the transmitting terminal to be not allowed (or to be allowed) (and/or configured for the receiving terminal not to use (or to use) the potential retransmission resources of transmitting terminal as the data transmission purpose of it's own and/or configured for the receiving terminal not to overhear (or to overhear) the HARQ feedback transmitted by another terminal and/or the number of the maximum (or minimum or average) allowed retransmission (resource) is configured relatively small (or high)). For example, when the congestion level is higher than the preconfigured threshold, it may be configured for the reservation of the potential retransmission resources of the transmitting terminal not to be allowed.

In this case, the threshold may be configured differently according to congestion level and/or SL (channel) quality and/or service type (and/or priority) and/or service related QOS parameter (and/or requirement) and/or cast type.

According to an embodiment of the present disclosure, in the case of a receiving terminal overhearing the HARQ feedback (eg, HARQ ACK) transmitted by another terminal (which has received the data transmitted by the transmitting terminal), only when at least one of the following the first condition through the third condition is satisfied, the transmitting terminal may be configured to (preferentially) use potential retransmission resources reserved (for later time points) for its own data transmission purpose. In an example, the threshold (or reference) on the conditions below may be configured differently according to CONGESTION LEVEL and/or SL (channel) quality (eg, SL CSI, SL RSRP/RSRQ/RSSI) and/or service type (and/or priority rank) and/or service-related QOS parameters (and/or requirements) (eg, RELIABILITY, LATENCY, PRIORITY) and/or CAST type (eg, UNICAST, GROUPCAST, BROADCAST), and/or HARQ feedback method (eg, NACK ONLY feedback, ACK/NACK feedback), etc. In another example, the operation of using the potential retransmission resources of the transmitting terminal by receiving terminal which has overheard the potential retransmission resources from another terminal for its own DATA transmission purpose (preferentially) may be configured through a signal predefined from the base station (eg, SIB, RRC signaling), or preconfigured (from the network) in advance.

The first condition according to an example is satisfying the preconfigured criterion (or threshold) for ACK judgment (for the overheard HARQ feedback). For example, the corresponding criterion (or threshold) may be configured differently compared to the case where the transmitting terminal determines as ACK (in a general communication situation) (for the HARQ feedback reported from the receiving terminal that has received its transmission data), or it may be configured relatively conservatively.

The second condition according to an example is satisfying the criterion (or threshold) of determining that there is no preconfigured NACK transmission (for the overheard HARQ feedback) (eg, interpreted as ACK) in the case of a NACK only feedback situation (eg, groupcast). And/or, the second condition is that though PSSCH (and/or PSCCH) (transmitted from the transmitting terminal) transmission(/reception) power is estimated(/measured) to be higher than the preconfigured threshold, but it is determined(/measured) that there is no NACK transmission (from another (target) terminal having received PSSCH (and/or PSCCH) transmitted from the corresponding transmitting terminal).

The third condition according to an example is that the overheard HARQ feedback (eg, ACK) transmission (and/or reception) power (eg, (DM-RS/sequence) RSRP, RSSI) is estimated (and/or measured) to be higher than the preconfigured threshold. For example, the third condition is that the overheard HARQ feedback transmission power is estimated to be higher than the preconfigured threshold. And/or, the third condition is that the overheard HARQ feedback-related PSCCH (scheduling PSSCH) is successfully decoded and/or the overheard HARQ feedback-related PSSCH (and/or PSCCH) transmission (and/or reception) power (eg, (DM-RS) RSRP, RSSI) is estimated (and/or measured) to be higher than a preconfigured threshold.

According to an embodiment of the present disclosure, using the potential retransmission resources of the transmitting terminal for its own data transmission by the receiving terminal (preferentially) (concerning the above-described embodiments) may be limited to a case where at least one of the following fourth condition through seventh condition is (additionally) satisfied. Here, as an example, the threshold on the condition below may be configured differently according to CONGESTION LEVEL and/or SL (channel) quality (eg, SL CSI, SL RSRP/RSRQ/RSSI) and/or service type (and/or priority) and/or service-related QOS parameters (and/or requirements) (eg, RELIABILITY, LATENCY, PRIORITY) and/or CAST types (eg, UNICAST, GROUPCAST, BROADCAST), and/or HARQ feedback method (eg, NACK ONLY feedback, ACK/NACK feedback), etc.

The fourth condition according to an example is that with a result from that the receiving terminal performs sensing, the number of candidate resources selectable/reservable for its PSCCH/PSSCH transmission is smaller than a preconfigured threshold. For example, when DM-RS RSRP measurement value (or the RSSI measurement value of the subchannel) on PSSCH scheduled by the successfully decoded SCI is greater than the preconfigured threshold, the subchannel occupied by the PSSCH is excluded from the number of selectable/reservable candidate resources.

The fifth condition according to an example is that congestion level (and/or (related to the packet to be transmitted) service priority and/or priority (and/or reliability) requirement) is higher than (or lower than) the preconfigured threshold. And/or, the fifth condition is that latency requirement (related to the packet to be transmitted) is lower (or higher) than the preconfigured threshold.

The sixth condition according to an example is that PRIORITY (and/or RELIABILITY) requirements related to packets transmitted by the TX UE on (previous) potential retransmission resources (and/or initial transmission resources) are (relatively) lower (or higher) than their own packets, and/or LATENCY requirements are (relatively) higher (or lower) than own packets.

The seventh condition is considering only potential retransmission resources of transmitting terminals belonging to the same group as receiving terminal (eg, GROUPCAST) (and/or session (eg, UNICAST)). For example, the seventh condition is considering potential retransmission resources of the transmission terminal included in the same group as the receiving terminal. And/or, the seventh condition is considering only OVERHEARING for HARQ feedback (eg, ACK) transmitted by other terminals. In an example, it may be identified based on (L1 or L2) DESTINATION ID information and/or (L1 or L2) SOURCE ID information on the PSCCH (and/or PSSCH) transmitted by the transmitting terminal.

According to an embodiment of the present disclosure, the potential retransmission resources of the transmitting terminal available for data transmission purpose of the receiving terminal (on the above described proposed method) may be defined to the closest potential retransmission resources after a (preconfigured) (minimum or maximum) time point required for processing (eg, decoding) (or detecting (whether the NACK transmission is performed)) by the receiving terminal from the time point (for example, the time point in which there is probability for the another terminal to perform the NACK transmission (eg, NACK only feedback case)) when the receiving terminal receives HARQ feedback (eg, ACK) transmitted from another terminal (which receives data of the transmitting terminal). For example, the potential retransmission resources of the transmitting terminal available for data transmission purpose of the receiving terminal may be defined to the closest potential retransmission resources after a time point required for processing by the receiving terminal from the time point when the receiving terminal receives HARQ feedback transmitted from another terminal. Alternatively, the potential retransmission resources of the transmitting terminal available for data transmission purpose of the receiving terminal (on the above described proposed method) may be defined to the closest potential retransmission resources after the time point in which the RX UE transmits HARQ feedback (eg, ACK and/or NACK) (to the TX UE). For example, the potential retransmission resources of the transmitting terminal available for data transmission purpose of the receiving terminal may be defined to the closest potential retransmission resources after the time point in which the RX UE transmits HARQ feedback.

According to an embodiment of the present disclosure, it may be configured for the terminal (or the receiving terminal) to exclude the slot including the potential retransmission resources (and/or an initial transmission resource) reserved by the transmitting terminal from the selectable/reservable candidate (PSCCH/PSSCH) transmission resource of its own. For example, the terminal (or receiving terminal) may exclude the slot including the potential retransmission resources (and/or an initial transmission resource) reserved by the transmitting terminal from the selectable/reservable candidate (PSCCH/PSSCH) transmission resource of its own.

According to an embodiment of the present disclosure, the transmitting terminal may notify the receiving terminal so that the receiving terminal does not use or uses the potential retransmission resource reserved by the transmitting terminal (at a later time point) for the data transmission purpose of the receiving terminal. Alternatively, the base station may (in advance) configure or inform the receiving terminal so that the receiving terminal does not use or uses the potential retransmission resource reserved by the transmitting terminal (at a later time point) for the data transmission purpose of the receiving terminal. Alternatively, it may be (in advance) defined by the system so that the receiving terminal does not use or uses the potential retransmission resource reserved by the transmitting terminal (at a later time point) for the data transmission purpose of the receiving terminal.

According to an embodiment of the present disclosure, it is possible to prevent the potential retransmission resource reserved by the transmitting terminal from being wasted unnecessarily.

Meanwhile, the embodiments described above in FIGS. 11A to 11C may be applied to at least one of the cases of FIGS. 12 to 14 below, or may be related to at least one of the cases of FIGS. 12 to 14. Hereinafter, various cases (or embodiments) related to a process in which a receiving terminal determines whether to use potential retransmission resources as candidate resources for SL transmission will be reviewed with reference to FIGS. 12 to 14.

Figure 12:
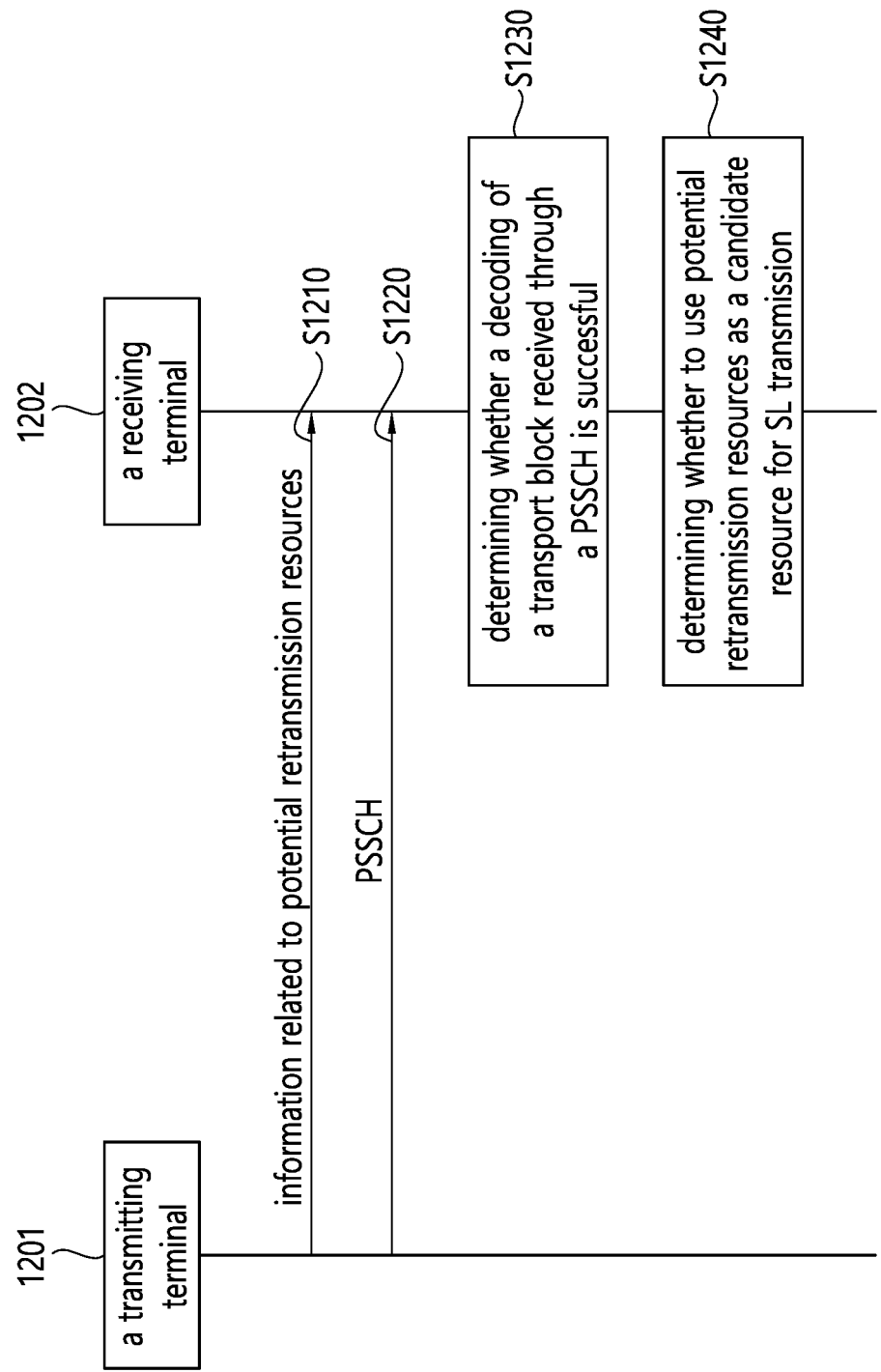
FIG. 12 shows a procedure in which a receiving terminal according to an embodiment of the present disclosure determines whether to use potential retransmission resources as a candidate resource for SL transmission.

FIG. 12 shows a procedure in which a receiving terminal according to an embodiment of the present disclosure determines whether to use potential retransmission resources as a candidate resource for SL transmission.

In one example, the transmitting terminal 1201 and the receiving terminal 1202 of FIG. 12 may perform unicast communication. That is, a unicast session is established between the transmitting terminal 1201 and the receiving terminal 1202, and the transmitting terminal 1201 may transmit information related to potential retransmission resources and/or PSSCH through the unicast session to the receiving terminal 1202. However, the example is not limited thereto, and for example, the receiving terminal 1202 of FIG. 12 may be one of the target terminals receiving the groupcast transmission of the transmitting terminal 1201.

In step S1210, the receiving terminal 1202 according to an embodiment may receive information related to potential retransmission resources from the transmitting terminal 1201. In one example, the information related to the potential retransmission resources may indicate information related to a plurality of resources.

In step S1220, the receiving terminal 1202 according to an embodiment may receive a Physical Sidelink Shared Channel (PSSCH) from the transmitting terminal 1201. In one example, the receiving terminal 1202 may receive the PSSCH and/or the PSCCH from the transmitting terminal 1201. In one example, the receiving terminal 1202 may receive the PSSCH and/or the PSCCH from the transmitting terminal 1201 on a first resource among the potential retransmission resources.

In step S1230, the receiving terminal 1202 according to an embodiment may determine whether decoding of a transport block received through the PSSCH is successful.

In one example, the receiving terminal 1202 may transmit the HARQ ACK to the transmitting terminal 1201 through a Physical Sidelink Feedback Channel (PSFCH) related to the PSSCH based on the successful decoding of the transport block. In addition, the receiving terminal 1202 may transmit the HARQ NACK to the transmitting terminal 1201 through the PSFCH based on the failure of decoding of the transport block.

In another example, the receiving terminal 1202 may not transmit the HARQ NACK to the transmitting terminal 1201 based on the successful decoding of the transport block. In addition, the receiving terminal 1202 may transmit the HARQ NACK to the transmitting terminal 1201 through the PSFCH related to the PSSCH based on the failure of decoding the transport block.

In step S1240, the receiving terminal 1202 according to an embodiment may determine whether to use the potential retransmission resources as candidate resources for SL transmission. In one example, the receiving terminal 1202 may determine whether to use resources after the first resource among the potential retransmission resources as candidate resources for SL transmission.

In one example, the receiving terminal 1202 may determine, among the potential retransmission resources, resources after the first resource, as candidate resources for SL transmission, based on the successful decoding of the transport block. Also, the receiving terminal 1202 may exclude resources after the first resource among the potential retransmission resources from candidate resources for SL transmission based on the failure of decoding of the transport block.

In another example, the receiving terminal 1202 may determine, based on that the HARQ ACK is transmitted to the transmitting terminal 1201, resources after the first resource among the potential retransmission resources as candidate resources for SL transmission. Also, the receiving terminal 1202 may exclude resources after the first resource among the potential retransmission resources from candidate resources for SL transmission based on the HACK NACK being transmitted to the transmitting terminal 1201.

In the other example, the receiving terminal 1202 may determine, based on that the HARQ NACK is not transmitted to the transmitting terminal 1201, among the potential retransmission resources, resources after the first resource as a candidate resource for SL transmission. In addition, the receiving terminal 1202 may exclude resources after the first resource among the potential retransmission resources from candidate resources for SL transmission based on the HARQ NACK being transmitted to the transmitting terminal 1201.

Figure 13:
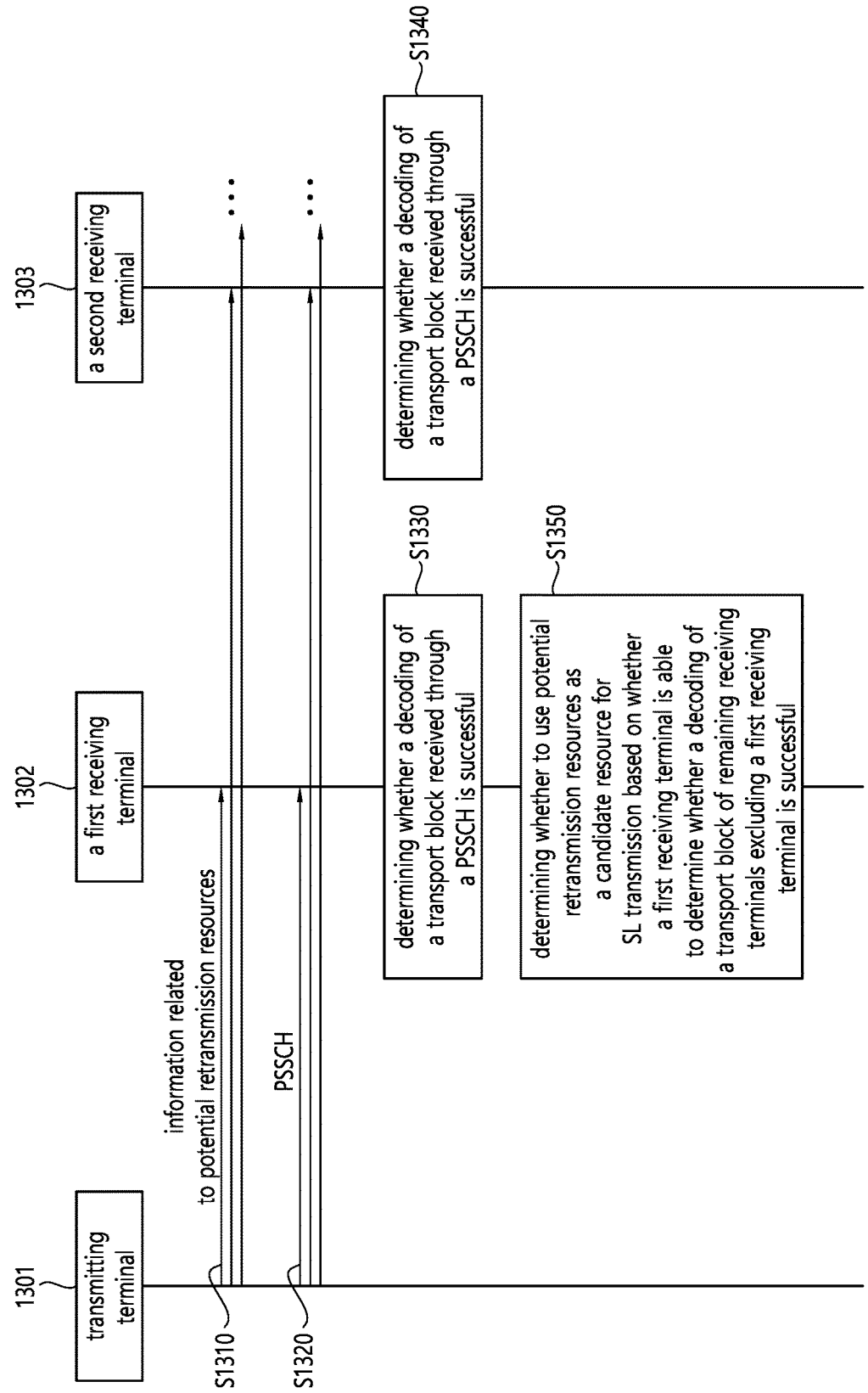
FIG. 13 shows a procedure in which a first receiving terminal according to an embodiment of the present disclosure determines potential retransmission resources as a candidate for SL transmission.

FIG. 13 shows a procedure in which a first receiving terminal according to an embodiment of the present disclosure determines potential retransmission resources as a candidate for SL transmission.

In one example, the transmitting terminal 1301, the first receiving terminal 1302, and the second receiving terminal 1303 of FIG. 13 may perform groupcast communication. That is, the first receiving terminal 1302 and the second receiving terminal 1303 may receive information related to potential retransmission resources and/or PSSCH through groupcast transmission of the transmitting terminal 1301.

In step S1310, the transmitting terminal 1301 according to an embodiment may transmit information related to potential retransmission resources to the first receiving terminal 1302, the second receiving terminal 1303, and/or the remaining receiving terminals. The first receiving terminal 1302 according to an embodiment may receive information related to potential retransmission resources from the transmitting terminal 1301. In one example, the information related to the potential retransmission resources may indicate information related to a plurality of resources.

In step S1320, the transmitting terminal 1301 according to an embodiment may transmit a PSSCH (Physical Sidelink Shared Channel) to the first receiving terminal 1302, the second receiving terminal 1303, and/or the remaining receiving terminals. In one example, the transmitting terminal 1301 may transmit the PSSCH and/or PSCCH to the first receiving terminal 1302, the second receiving terminal 1303 and/or the remaining receiving terminals. In one example, the receiving terminal 1302 may receive the PSSCH and/or the PSCCH from the transmitting terminal 1301 on a first resource among the potential retransmission resources.

In step S1330, the first receiving terminal 1302 according to an embodiment may determine whether decoding of the transport block received through the PSSCH succeeds.

In one example, the first receiving terminal 1302 may transmit the HARQ ACK to the transmitting terminal 1301 through a Physical Sidelink Feedback Channel (PSFCH) related to the PSSCH based on the successful decoding of the transport block. In addition, the first receiving terminal 1302 may transmit the HARQ NACK to the transmitting terminal 1301 through the PSFCH based on the failure of decoding the transport block.

In another example, the first receiving terminal 1302 may not transmit the HARQ NACK to the transmitting terminal 1301 based on the successful decoding of the transport block. In addition, the receiving terminal 1302 may transmit the HARQ NACK to the transmitting terminal 1301 through the PSFCH related to the PSSCH based on the failure of decoding the transport block.

In step S1340, the second receiving terminal 1303 according to an embodiment may determine whether decoding of the transport block received through the PSSCH succeeds.

In one example, the second receiving terminal 1303 may transmit a HARQ ACK to the transmitting terminal 1301 through a Physical Sidelink Feedback Channel (PSFCH) related to the PSSCH based on the successful decoding of the transport block. In addition, the second receiving terminal 1303 may transmit the HARQ NACK to the transmitting terminal 1301 through the PSFCH based on the failure of decoding the transport block.

In another example, the second receiving terminal 1303 may not transmit the HARQ NACK to the transmitting terminal 1301 based on the successful decoding of the transport block. In addition, the second receiving terminal 1302 may transmit the HARQ NACK to the transmitting terminal 1301 through the PSFCH related to the PSSCH based on the failure of decoding the transport block.

In one embodiment, the remaining receiving terminals excluding the first receiving terminal 1302 and the second receiving terminal 1303 among the plurality of receiving terminals receiving the groupcast transmission of the transmitting terminal 1301 may receive information related to potential retransmission resources from the transmitting terminal 1301, receive a PSSCH and/or a PSCCH, and determine whether decoding of a transport block received through the PSSCH succeeds.

In step S1350, the first receiving terminal 1302 according to an embodiment may determine whether to use the potential retransmission resources as a candidate resource for SL transmission based on whether the first receiving terminal 1302 may determine whether decoding of the transport blocks of the remaining receiving terminals except for the first receiving terminal 1302 is successful.

The first receiving terminal 1302 according to an embodiment may transmit the HARQ ACK to the transmitting terminal 1301. The first receiving terminal 1302 may exclude the potential retransmission resources after the first resource from the candidate resources for the SL transmission of the first receiving terminal 1302 based on that the first receiving terminal 1302 cannot determine whether decoding of the transport block of a plurality of receiving terminals except for the first receiving terminal 1302 is successful.

The first receiving terminal 1302 according to an embodiment may determine whether at least one receiving terminal among a plurality of receiving terminals except for the first receiving terminal 1302 transmits the HARQ NACK to the transmitting terminal 1301 through the PSFCH related to the PSSCH based on that the first receiving terminal 1302 can determine whether decoding of the transport blocks of a plurality of receiving terminals except for the first receiving terminal 1302 is successful. The first receiving terminal 1302 may determine the potential retransmission resources after the first resource as the candidate resource for the SL transmission based on that the first receiving terminal 1302 succeeds to decoding for the transport block (eg, when the first receiving terminal 1302 does not transmit HARQ NACK to the transmitting terminal 1301 in a specific time duration in which the HARQ NACK should be transmitted), and at least one receiving terminal among the plurality of receiving terminals except for the first receiving terminal 1302 has determined not to transmit HARQ NACK to the transmitting terminal 1301 through a PSFCH related to the PSSCH.

The first receiving terminal 1302 according to an embodiment may determine whether at least one receiving terminal among the plurality of receiving terminals except for the first receiving terminal 1302 transmits HARQ NACK to the transmitting terminal 1302 through a PSFCH related to the PSSCH based on that the first receiving terminal 1302 may determine whether decoding of the transport block by the plurality of receiving terminals except for the first receiving terminal 1302 is successful. The first receiving terminal 1302 may exclude the potential retransmission resources after the first resource from the candidate resource for the SL transmission of the first receiving terminal 1302 based on that the first receiving terminal 1302 succeeds to decoding for the transport block (eg, when the first receiving terminal 1302 does not transmit HARQ NACK to the transmitting terminal 1301 in a specific time duration in which the HARQ NACK should be transmitted), and it is determined for at least one receiving terminal among the plurality of receiving terminals except for the first receiving terminal 1302 to transmit HARQ NACK to the transmitting terminal 1301 through a PSFCH related to the PSSCH.

Figure 14:
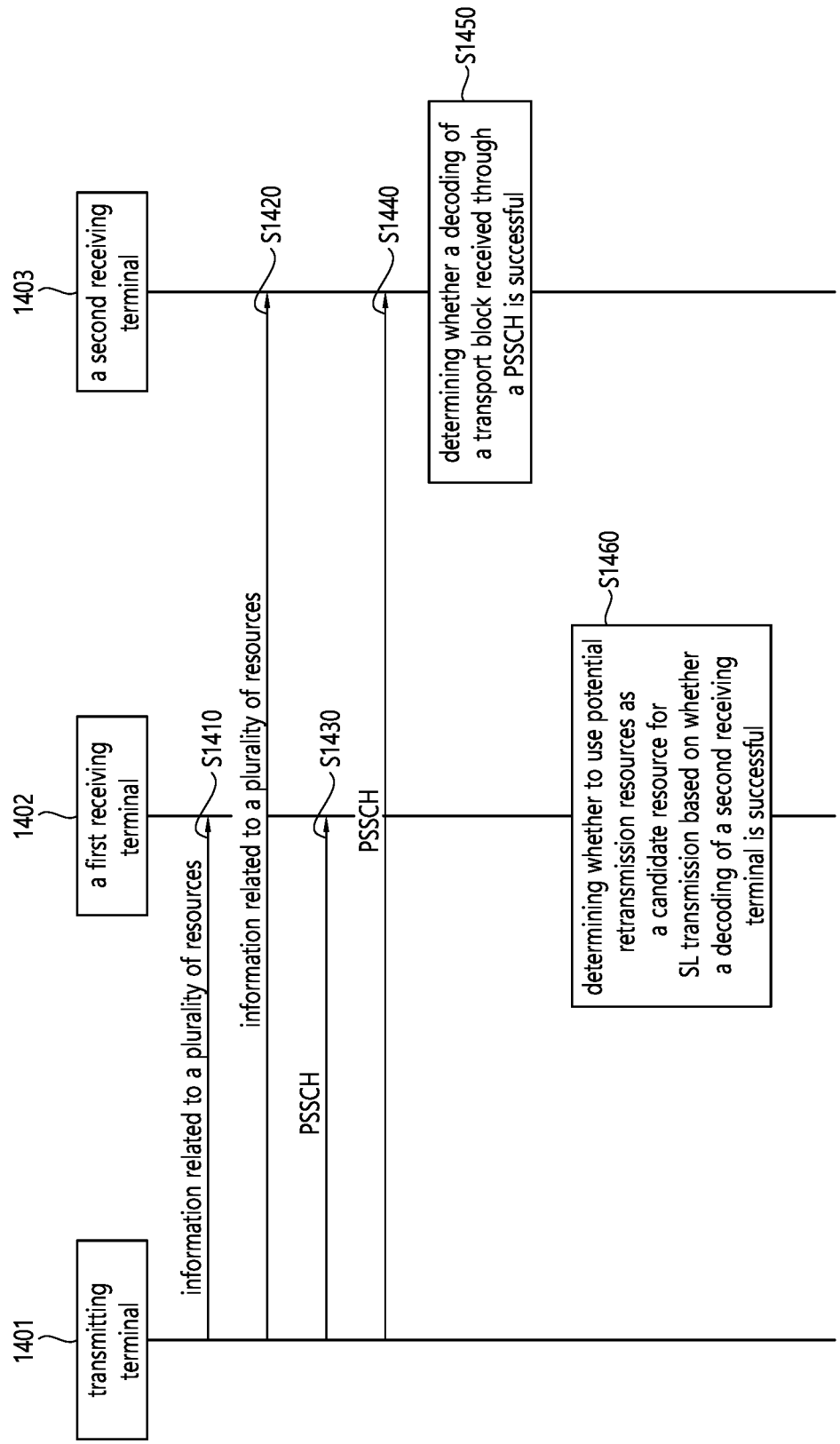
FIG. 14 shows a procedure in which a first receiving terminal according to an embodiment of the present disclosure determines potential retransmission resources as a candidate resource for SL transmission.

FIG. 14 shows a procedure in which a first receiving terminal according to an embodiment of the present disclosure determines potential retransmission resources as a candidate resource for SL transmission.

In one example, the transmitting terminal 1401 and the first receiving terminal 1402 of FIG. 14 may perform unicast communication (eg, first unicast communication), and the transmitting terminal 1401 and the second receiving terminal 1403 may perform another unicast communication (eg, a second unicast communication). In another example, the first receiving terminal 1402 of FIG. 14 is one of terminals performing groupcast communication with the transmitting terminal 1401, and the second receiving terminal 1403 may perform unicast communication with the transmitting terminal 1401. In another example, the transmitting terminal 1401 and the first receiving terminal 1402 of FIG. 14 may perform unicast communication, and the second receiving terminal 1403 may be one of terminals performing groupcast communication with the transmitting terminal 1401. In another example, the first receiving terminal 1402 of FIG. 14 may be one of terminals performing groupcast communication (eg, first groupcast communication) with the transmitting terminal 1401, and the second receiving terminal 1403 may be one of terminals performing another groupcast communication (eg, the second groupcast communication) with the transmitting terminal 1401.

In step S1410, the first receiving terminal 1402 according to an embodiment may receive information related to potential retransmission resources from the transmitting terminal 1401. In one example, the information related to the potential retransmission resources may indicate information related to a plurality of resources.

In step S1420, the second receiving terminal 1403 according to an embodiment may receive information related to potential retransmission resources from the transmitting terminal 1401. In one example, the information related to the potential retransmission resources may indicate information related to a plurality of resources.

In step S1430, the first receiving terminal 1402 according to an embodiment may receive a Physical Sidelink Shared Channel (PSSCH) from the transmitting terminal 1401. In one example, the first receiving terminal 1402 may receive the PSSCH and/or the PSCCH from the transmitting terminal 1401. In one example, the first receiving terminal 1402 may receive the PSSCH and/or the PSCCH from the transmitting terminal 1401 on a first resource among the potential retransmission resources.

In step S1440, the second receiving terminal 1403 according to an embodiment may receive a Physical Sidelink Shared Channel (PSSCH) from the transmitting terminal 1401. In one example, the second receiving terminal 1403 may receive the PSSCH and/or the PSCCH from the transmitting terminal 1401. In one example, the second receiving terminal 1403 may receive the PSSCH and/or the PSCCH from the transmitting terminal 1401 on the first resource among the potential retransmission resources.

In one example, the PSSCH and/or PSCCH transmitted from the transmitting terminal 1401 to the first receiving terminal 1402 may be different from the PSSCH and/or PSCCH transmitted from the transmitting terminal 1401 to the second receiving terminal 1403. For example, the PSSCH and/or PSCCH transmitted from the transmitting terminal 1401 to the first receiving terminal 1402 may be transmitted on a resource area different from that of the PSSCH and/or PSCCH transmitted from the transmitting terminal 1401 to the second receiving terminal 1403. For example, the PSSCH and/or PSCCH transmitted from the transmitting terminal 1401 to the first receiving terminal 1402 may be transmitted on the frequency domain different from that of the PSSCH and/or PSCCH transmitted from the transmitting terminal 1401 to the second receiving terminal 1403. The PSSCH and/or PSCCH transmitted from the transmitting terminal 1401 to the first receiving terminal 1402 may be transmitted on a different time domain from the PSSCH and/or PSCCH transmitted from the transmitting terminal 1401 to the second receiving terminal 1403.

In step S1450, the second receiving terminal 1403 according to an embodiment may determine whether decoding of a transport block received through the PSSCH succeeds.

In one example, the second receiving terminal 1203 may transmit the HARQ ACK to the transmitting terminal 1401 through a Physical Sidelink Feedback Channel (PSFCH) related to the PSSCH based on the successful decoding of the transport block. In addition, the second receiving terminal 1403 may transmit the HARQ NACK to the transmitting terminal 1401 through the PSFCH based on the failure of decoding the transport block.

In another example, the second receiving terminal 1403 may not transmit the HARQ NACK to the transmitting terminal 1401 based on the successful decoding of the transport block. In addition, the second receiving terminal 1403 may transmit the HARQ NACK to the transmitting terminal 1401 through the PSFCH related to the PSSCH based on the failure of decoding the transport block.

In step S1460, the first receiving terminal 1402 may determine whether to use the potential retransmission resources as candidate resources for SL transmission, based on whether the decoding of the second receiving terminal 1403 is successful. In one example, the first receiving terminal 1402 may overhear the HARQ feedback of the second receiving terminal 1403 to determine whether to use the potential retransmission resources as candidate resources for SL transmission.

In an embodiment, the first receiving terminal 1402 may determine that decoding of the transport block by the second receiving terminal 1403 is successful based on receiving the HARQ ACK through the PSFCH from the second receiving terminal 1403. The first receiving terminal 1402 may determine that decoding of the transport block is successful by the second receiving terminal 1403 based on the HARQ ACK overheard from the second receiving terminal 1403 through the PSFCH. The first receiving terminal 1402 may determine the potential retransmission resources as candidate resources for SL transmission based on the determination that decoding of the transport block is successful by the second receiving terminal 1403.

In one embodiment, the first receiving terminal 1402 may determine the potential retransmission resources as candidate resources for SL transmission based on that the measured reception power of the HARQ ACK received through the PSFCH from the first receiving terminal 1402 and the second receiving terminal 1403 is higher than a preconfigured threshold.

In an embodiment, the first receiving terminal 1402 may determine that decoding for the transport block by the second receiving terminal 1403 is successful based on not receiving HARQ NACK from the second receiving terminal 1403 on a resource area for the PSFCH. The first receiving terminal 1402 may determine the potential retransmission resources as the candidate resource for the SL transmission based on the determination that the decoding of the transport block by the second receiving terminal 1403 is successful.

In an embodiment, based on at least one of a congestion level, an SL channel quality, a service type, or a service-related QoS parameter, whether to use the potential retransmission resources as a candidate resource for SL transmission may be determined.

Figure 15:
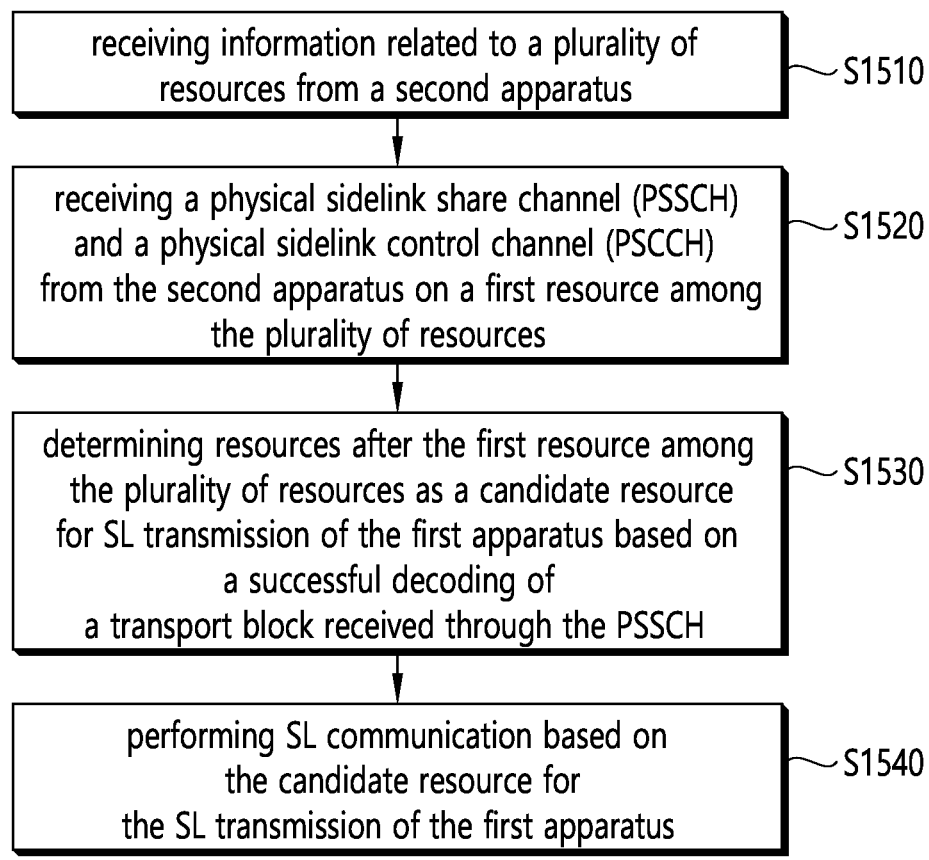
FIG. 15 is a flowchart illustrating an operation of a first apparatus according to an embodiment of the present disclosure.

FIG. 15 is a flowchart illustrating an operation of a first apparatus according to an embodiment of the present disclosure.

Operations disclosed in the flowchart of FIG. 15 may be performed in combination with various embodiments of the present disclosure. In one example, operations disclosed in the flowchart of FIG. 15 may be performed based on at least one of the devices illustrated in FIGS. 17 to 22. In an example, the first apparatus of FIG. 15 may correspond to the first wireless device 100 of FIG. 18 to be described later. In another example, the first apparatus of FIG. 15 may correspond to the second wireless device 200 of FIG. 18 to be described later.

In step S1510, the first apparatus according to an embodiment may receive information related to a plurality of resources from a second apparatus.

In step S1520, the first apparatus according to an embodiment may receive a physical sidelink share channel (PSSCH) and a physical sidelink control channel (PSCCH) from the second apparatus on a first resource among the plurality of resources.

In step S1530, the first apparatus according to an embodiment may determine resources after the first resource among the plurality of resources as a candidate resource for SL transmission of the first apparatus based on a successful decoding of a transport block received through the PSSCH.

In step S1540, the first apparatus according to an embodiment may perform SL communication based on the candidate resource for the SL transmission of the first apparatus.

In an embodiment, the resources after the first resource determined as the candidate resource are resources after a time when a processing time required for the first apparatus to transmit hybrid automatic repeat request (HARQ) feedback information through a physical sidelink feedback channel (PSFCH) related to the PSSCH to the second apparatus has elapsed or a time when a processing of the HARQ feedback information is completed by the second apparatus after the second apparatus receives the HARQ feedback information.

In one example, the processing time required for the second apparatus to complete the processing of the HARQ feedback information after receiving the HARQ feedback information may be referred to the processing time for the PSFCH of the second apparatus. The processing time for the PSFCH of the second apparatus may be preconfigured. For example, the processing time for the PSFCH of the second apparatus may be preconfigured in a resource pool-specific manner. For example, the processing time for the PSFCH of the second apparatus may be preconfigured based on the service type. For example, the processing time for the PSFCH of the second apparatus may be preconfigured based on priority.

In an embodiment, based on at least one of a congestion level, an SL channel quality, a service type, or a service-related QoS parameter, whether to use the resources after the first resource as the candidate resource may be determined.

In an embodiment, the PSSCH may be transmitted from the second apparatus to the first apparatus through a unicast connection established between the first apparatus and the second apparatus.

In an embodiment, the HARQ feedback information may include HARQ acknowledgement (ACK) or HARQ negative acknowledgement (NACK). The first apparatus may transmit the HARQ ACK to the second apparatus through a physical sidelink feedback channel (PSFCH) related to the PSSCH based on the successful decoding of the transport block by the first apparatus, and may determine the resources after the first resource as the candidate resource for the SL transmission of the first apparatus based on the HARQ ACK being transmitted to the second apparatus.

In an embodiment, the PSSCH may be transmitted to a plurality of apparatuses performing groupcast communication with the second apparatus, and the plurality of apparatuses may include the first apparatus. The first apparatus may determine the resources after the first resource as the candidate resource based on the successful decoding of the transport block by the first apparatus, and based on whether the first apparatus is able to determine whether a decoding of the transport block by the plurality of apparatuses excluding the first apparatus is successful.

In an embodiment, the HARQ feedback information may include HARQ ACK or HARQ NACK. The first apparatus may transmit the HARQ ACK to the second apparatus through the PSFCH related to the PSSCH based on the successful decoding of the transport block by the first apparatus. The first apparatus may determine to exclude the resources after the first resource from the candidate resource for the SL transmission of the first apparatus based on that the first apparatus is not able to determine whether a decoding of the transport block by the plurality of apparatuses excluding the first apparatus is successful.

In an embodiment, the HARQ feedback information may include HARQ NACK. The first apparatus may determine whether at least one apparatus among the plurality of apparatuses excluding the first apparatus transmits the HARQ NACK to the second apparatus through the PSFCH related to the PSSCH based on that the first apparatus does not transmit HARQ ACK to the second apparatus by succeeding to the decoding of the transport block, and based on that the first apparatus is able to determine whether the decoding of the transport block by the plurality of apparatuses excluding the first apparatus is successful. The first apparatus may determine the resources after the first resource as the candidate resource for the SL transmission of the first apparatus based on the successful decoding of the transport block by the first apparatus and based on that the at least one apparatus among the plurality of apparatuses excluding the first apparatus is determined not to transmit the HARQ NACK to the second apparatus through the PSFCH.

In an embodiment, a slot whose time resource overlaps with the plurality of resources may be excluded from the candidate resource for the SL transmission of the first apparatus.

According to an embodiment of the present disclosure, a first apparatus for performing sidelink (SL) communication may be provided. The first apparatus includes at least one memory storing instructions, at least one transceiver and at least one processor connecting the at least one memory and the at least one transceiver, wherein the at least one processor is configured to: control the at least one transceiver to receive information related to a plurality of resources from a second apparatus, control the at least one transceiver to receive a physical sidelink share channel (PSSCH) and a physical sidelink control channel (PSCCH) from the second apparatus on a first resource among the plurality of resources, determine resources after the first resource among the plurality of resources as a candidate resource for SL transmission of the first apparatus based on a successful decoding of a transport block received through the PSSCH, and perform SL communication based on the candidate resource for the SL transmission of the first apparatus.

According to an embodiment of the present disclosure, an apparatus (or chip(set)) controlling a first terminal may be provided. The apparatus includes at least one processor and at least one computer memory that is executably connected by the at least one processor and stores instructions, wherein, by the at least one processor executing the instructions, the first terminal: receive information related to a plurality of resources from a second terminal, receive a physical sidelink share channel (PSSCH) and a physical sidelink control channel (PSCCH) from the second terminal on a first resource among the plurality of resources, determine resources after the first resource among the plurality of resources as a candidate resource for SL transmission of the first terminal based on a successful decoding of a transport block received through the PSSCH, and perform SL communication based on the candidate resource for the SL transmission of the first terminal.

In an embodiment, the first terminal of the embodiment may represent the first apparatus described throughout the present disclosure. In an embodiment, the at least one processor, at least one memory, or the like in the apparatus for controlling the first terminal may be implemented as respective separate sub chips, or at least two or more components may be implemented through one sub chip.

According to an embodiment of the present disclosure, a non-transitory computer-readable storage medium having instructions stored thereon may be provided. Based on the instructions being executed by at least one processor: information related to a plurality of resources is received by a first apparatus from a second apparatus, a physical sidelink share channel (PSSCH) and a physical sidelink control channel (PSCCH) are received by the first apparatus from the second apparatus on a first resource among the plurality of resources, resources after the first resource among the plurality of resources are determined by the first apparatus as a candidate resource for SL transmission of the first apparatus based on a successful decoding of a transport block received through the PSSCH, and SL communication is performed by the first apparatus based on the candidate resource for the SL transmission of the first apparatus.

Figure 16:
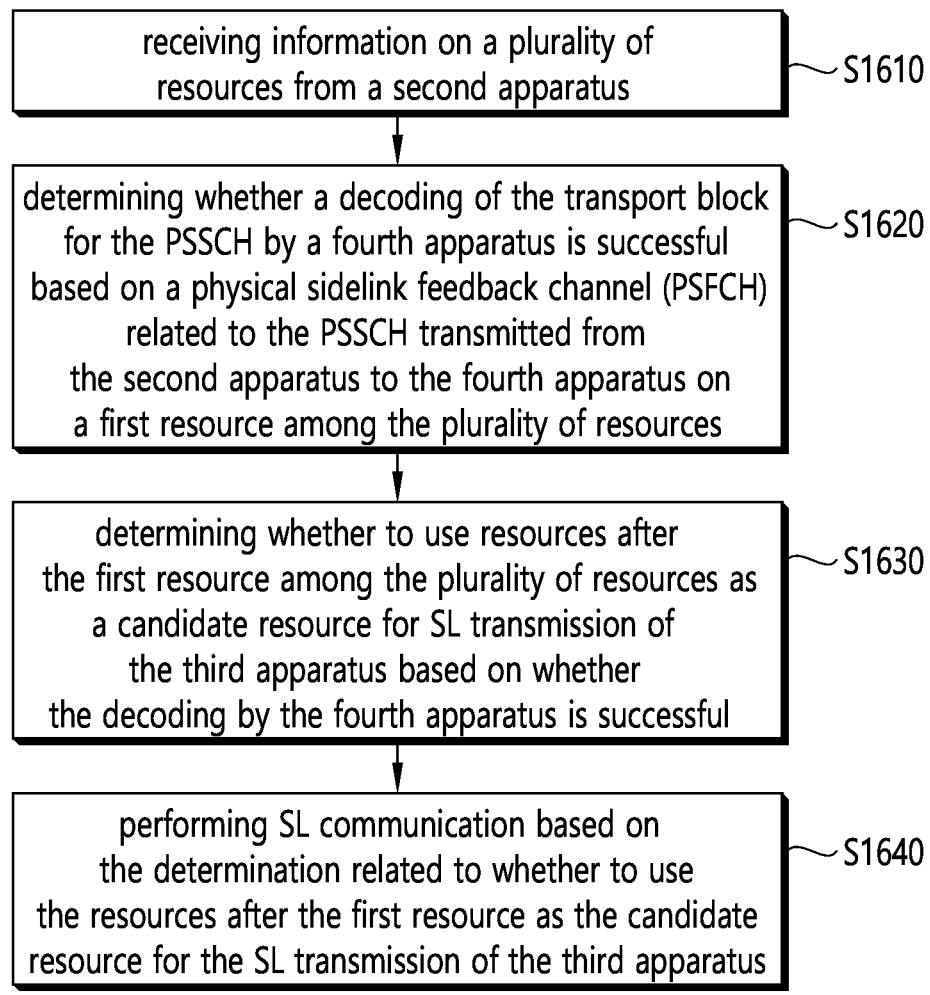
FIG. 16 is a flowchart illustrating an operation of a second apparatus according to an embodiment of the present disclosure.

FIG. 16 is a flowchart illustrating an operation of a third apparatus according to an embodiment of the present disclosure.

The operations disclosed in the flowchart of FIG. 16 may be performed in combination with various embodiments of the present disclosure. In one example, operations disclosed in the flowchart of FIG. 16 may be performed based on at least one of the devices illustrated in FIGS. 17 to 22. In one example, the third apparatus of FIG. 16 may correspond to the first wireless device 100 of FIG. 18 to be described later. In another example, the third apparatus of FIG. 16 may correspond to the second wireless device 200 of FIG. 18 to be described later.

In step S1610, the third apparatus according to an embodiment may receive information on a plurality of resources from a second apparatus.

In step S1620, the third apparatus according to an embodiment may determine whether a decoding of the transport block for the PSSCH by a fourth apparatus is successful based on a physical sidelink feedback channel (PSFCH) related to the PSSCH transmitted from the second apparatus to the fourth apparatus on a first resource among the plurality of resources.

In step S1630, the third apparatus according to an embodiment may determine whether to use resources after the first resource among the plurality of resources as a candidate resource for SL transmission of the third apparatus based on whether the decoding by the fourth apparatus is successful.

In step S1640, the third apparatus according to an embodiment may perform SL communication based on the determination related to whether to use the resources after the first resource as the candidate resource for the SL transmission of the third apparatus.

In an embodiment, whether to use the resources after the first resource as the candidate resource may be determined based on at least one of a congestion level, SL channel quality, service type or a QoS parameter related to a service.

The third apparatus according to an embodiment may determine that the decoding of the transport block by the fourth apparatus is successful based on receiving HARQ ACK from the fourth apparatus through the PSFCH.

The third apparatus according to an embodiment may determine to use the resources after the first resource as the candidate resource for the SL transmission based on a measure reception power of the HARQ ACK being higher than a preconfigured threshold.

In an embodiment, the resources after the first resource, which are determined to be used as the candidate resource, are resources after a time point in which a time required for the third apparatus to process the HARQ feedback information elapsed from a time point in which the third apparatus received the HARQ feedback information from the fourth apparatus through the PSFCH or a time point expected to receive the HARQ feedback information.

The third apparatus according to an embodiment may determine that the decoding of the transport block by the fourth apparatus is successful based on not receiving HARQ NACK on a resource area for the PSFCH from the fourth apparatus.

According to an embodiment of the present disclosure, a third apparatus for performing sidelink (SL) communication may be provided. The third apparatus includes at least one memory storing instructions, at least one transceiver and at least one processor connecting the at least one memory and the at least one transceiver, wherein the at least one processor is configured to: control the at least one transceiver to receive information on a plurality of resources from a second apparatus, determine whether a decoding of the transport block for the PSSCH by a fourth apparatus is successful based on a physical sidelink feedback channel (PSFCH) related to the PSSCH transmitted from the second apparatus to the fourth apparatus on a first resource among the plurality of resources, determine whether to use resources after the first resource among the plurality of resources as a candidate resource for SL transmission of the third apparatus based on whether the decoding by the fourth apparatus is successful, and perform SL communication based on the determination related to whether to use the resources after the first resource as the candidate resource for the SL transmission of the third apparatus.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
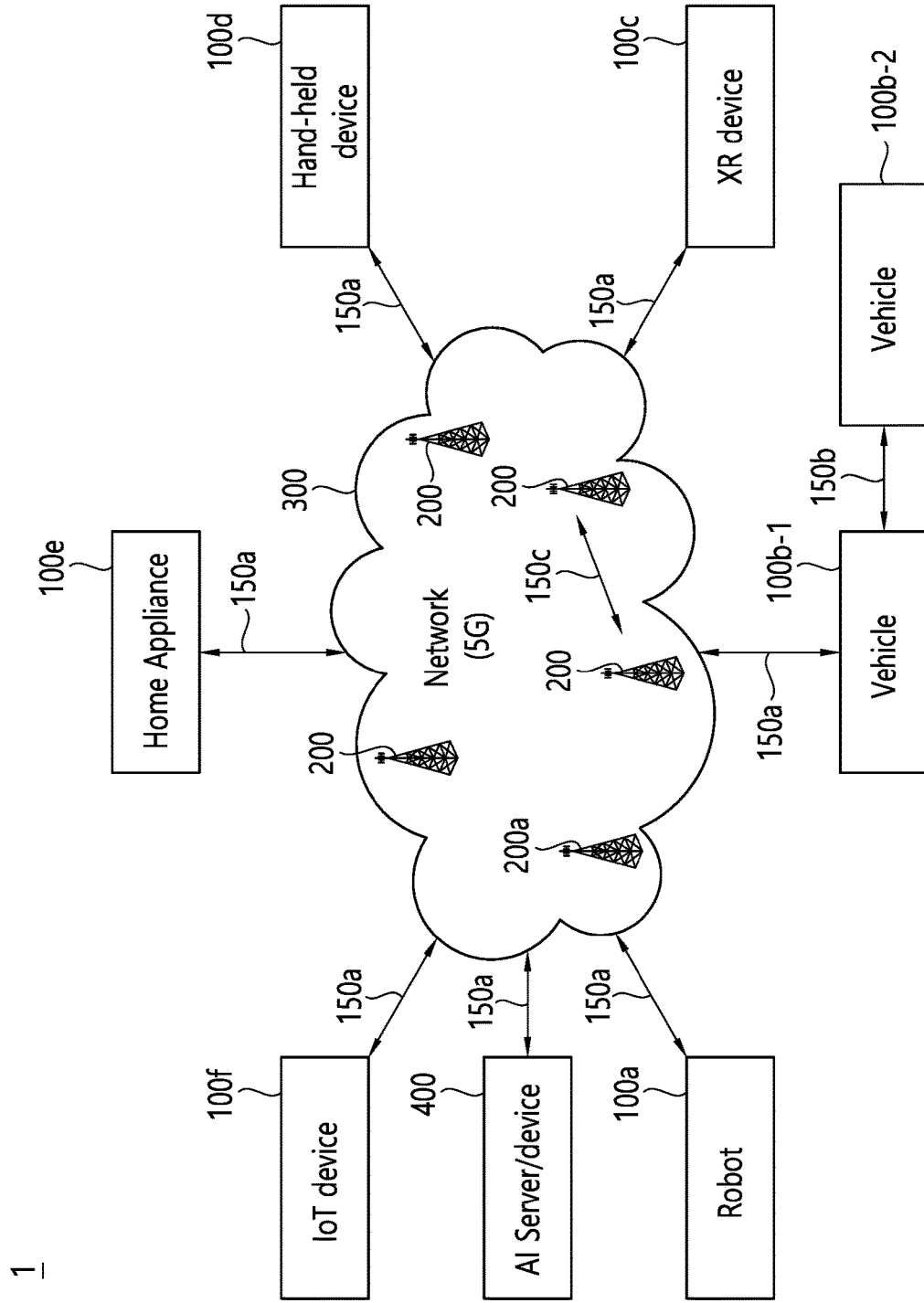
FIG. 17 shows a communication system 1, in accordance with an embodiment of the present disclosure.

FIG. 17 shows a communication system 1, in accordance with an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
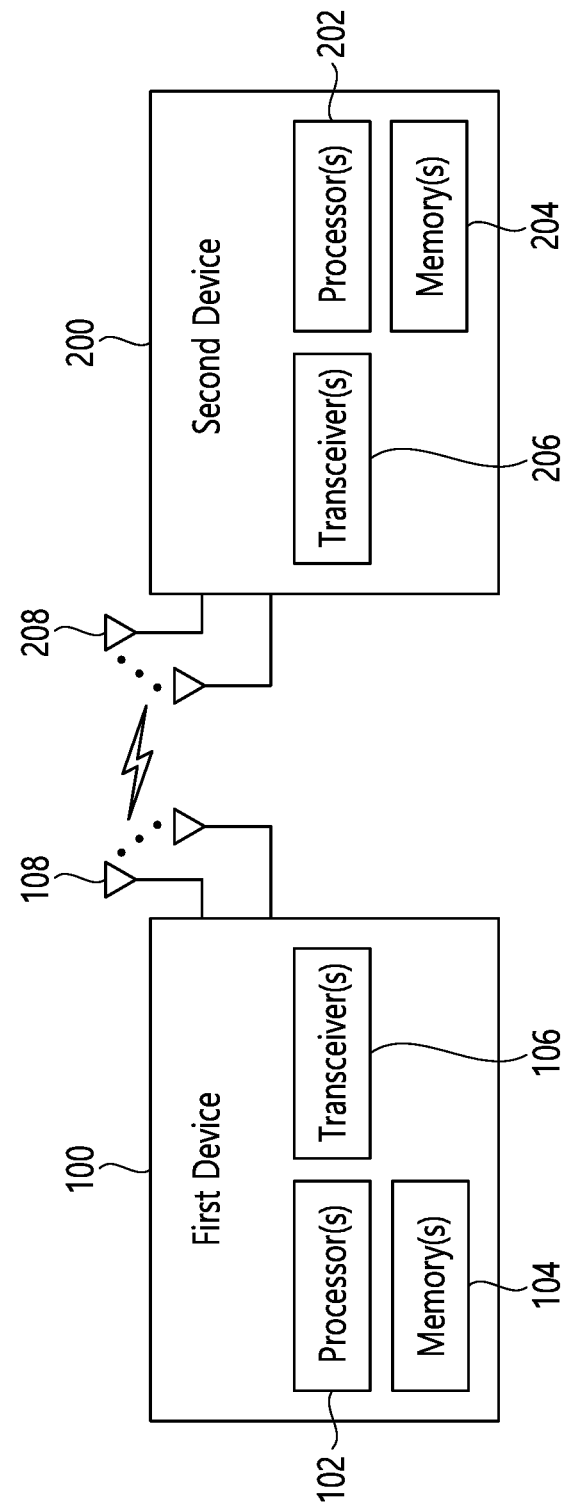
FIG. 18 shows wireless devices, in accordance with an embodiment of the present disclosure.

FIG. 18 shows wireless devices, in accordance with an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
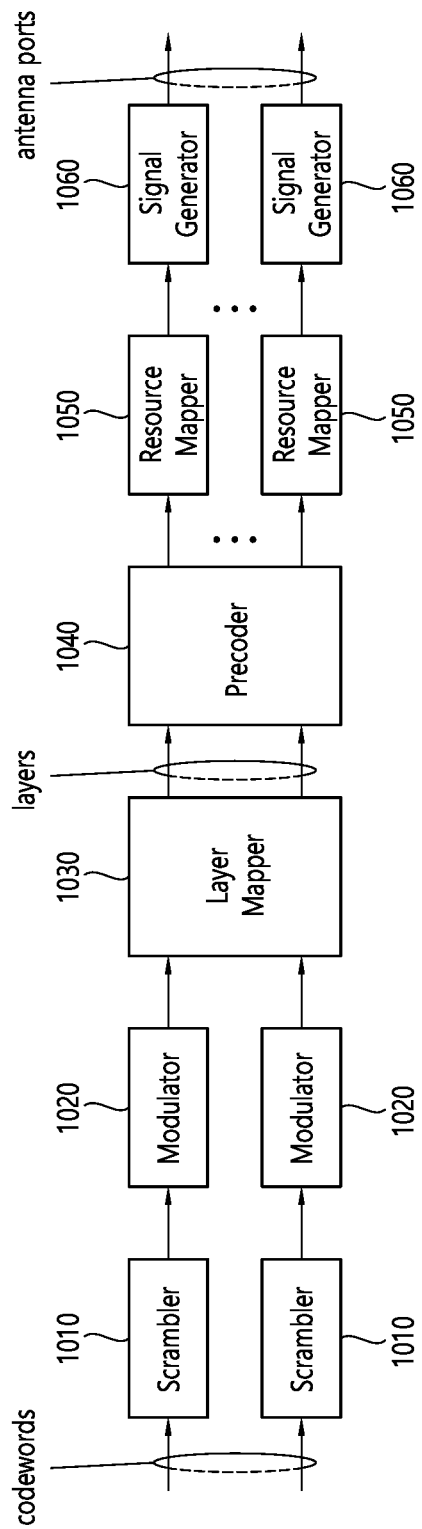
FIG. 19 shows a signal process circuit for a transmission signal, in accordance with an embodiment of the present disclosure.

FIG. 19 shows a signal process circuit for a transmission signal, in accordance with an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed by, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
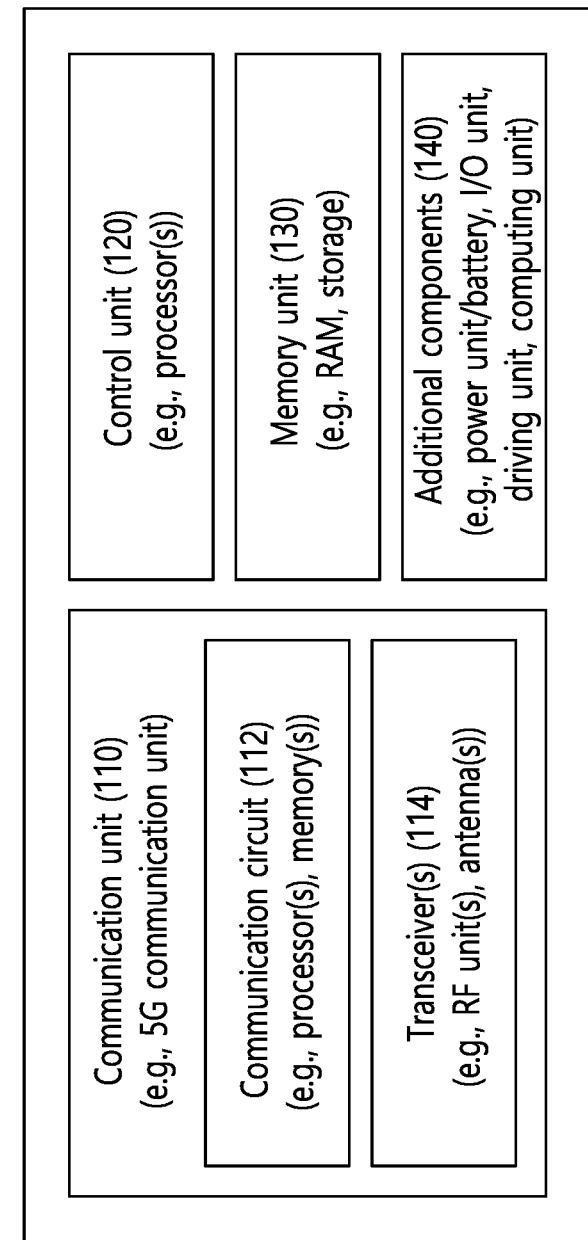
FIG. 20 shows a wireless device, in accordance with an embodiment of the present disclosure.

FIG. 20 shows a wireless device, in accordance with an embodiment of the present disclosure. The wireless device may be implemented in various forms according to a use-case/service (see FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
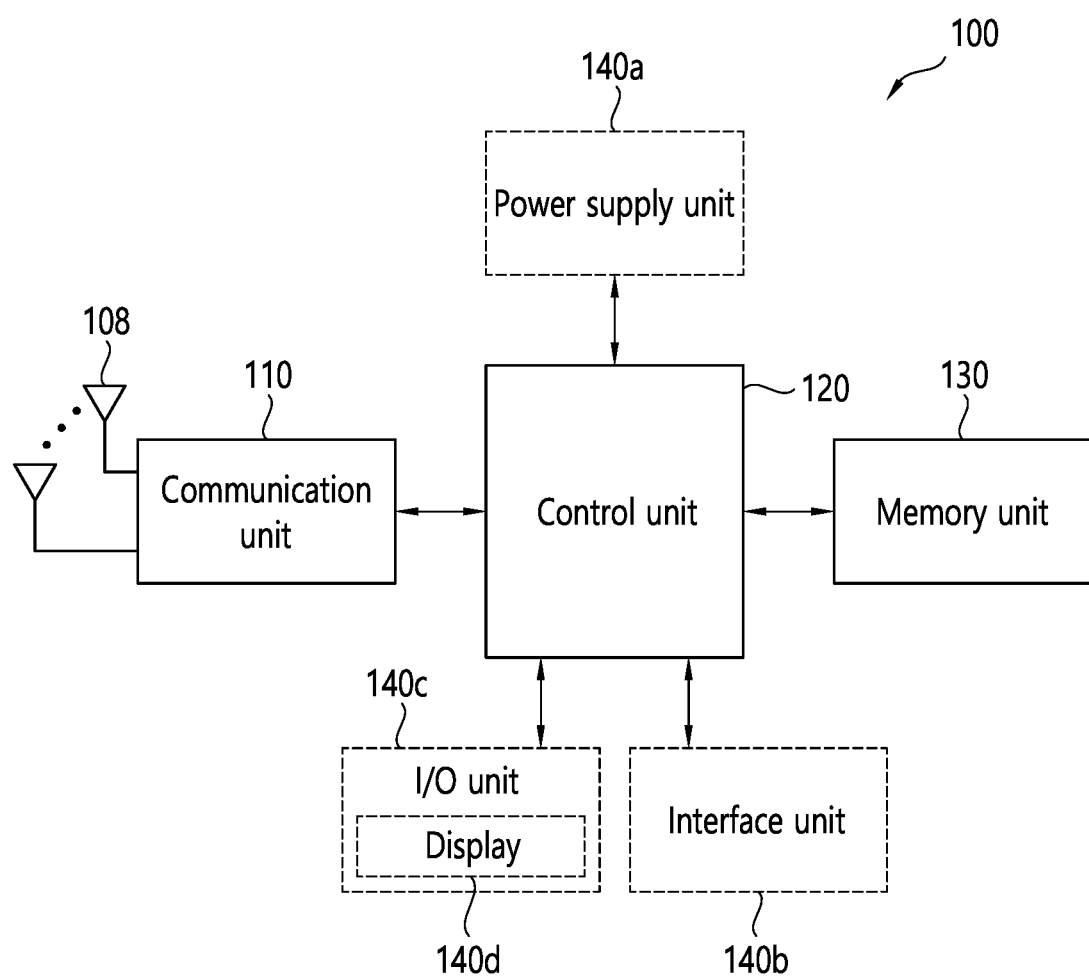
FIG. 21 shows a hand-held device, in accordance with an embodiment of the present disclosure.

FIG. 21 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 22 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 22, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication by a first apparatus, the method including:
    receiving information related to a plurality of resources from a second apparatus;
    receiving a physical sidelink share channel (PSSCH) and a physical sidelink control channel (PSCCH) from the second apparatus on a first resource among the plurality of resources;
    determining resources after the first resource among the plurality of resources as a candidate resource for SL transmission by the first apparatus based on a successful decoding of a transport block received through the PSSCH; and
    performing SL communication based on the candidate resource for the SL transmission by the first apparatus,
    wherein the resources after the first resource determined as the candidate resource are resources after a processing time required for the first apparatus to transmit hybrid automatic repeat request (HARQ) feedback information through a physical sidelink feedback channel (PSFCH) related to the PSSCH to the second apparatus has elapsed or after processing of the HARQ feedback information is completed by the second apparatus after the second apparatus receives the HARQ feedback information.

2. The method of claim 1, wherein the PSSCH is transmitted from the second apparatus to the first apparatus through a unicast connection established between the first apparatus and the second apparatus.

3. The method of claim 2,
    wherein the HARQ feedback information includes HARQ acknowledgement (ACK) or HARQ negative acknowledgement (NACK), and
    wherein the determining the resources after the first resource as the candidate resource for the SL transmission of the first apparatus includes:
    transmitting the HARQ ACK to the second apparatus through the PSFCH related to the PSSCH based on the successful decoding of the transport block by the first apparatus; and
    determining the resources after the first resource as the candidate resource for the SL transmission of the first apparatus based on the HARQ ACK being transmitted to the second apparatus.

4. The method of claim 1,
    wherein the PSSCH is transmitted to a plurality of apparatuses performing groupcast communication with the second apparatus,
    wherein the plurality of apparatuses includes the first apparatus, and
    wherein the determining the resources after the first resource as the candidate resource for the SL transmission of the first apparatus includes:
    determining the resources after the first resource as the candidate resource based on the successful decoding of the transport block by the first apparatus, and based on whether the first apparatus is able to determine whether a decoding of the transport block by the plurality of apparatuses excluding the first apparatus is successful.

5. The method of claim 4,
    wherein the HARQ feedback information includes HARQ ACK or HARQ NACK, and
    wherein the determining the resources after the first resource as the candidate resource for the SL transmission of the first apparatus based on the successful decoding of the transport block by the first apparatus, and based on whether the first apparatus is able to determine whether the decoding of the transport block by the plurality of apparatuses excluding the first apparatus is successful includes:
    transmitting the HARQ ACK to the second apparatus through the PSFCH related to the PSSCH based on the successful decoding of the transport block by the first apparatus; and
    determining to exclude the resources after the first resource from the candidate resource for the SL transmission of the first apparatus based on that the first apparatus is not able to determine whether a decoding of the transport block by the plurality of apparatuses excluding the first apparatus is successful.

6. The method of claim 4,
    wherein the HARQ feedback information includes HARQ NACK, and
    wherein the determining the resources after the first resource as the candidate resource based on the successful decoding of the transport block by the first apparatus, and based on whether the first apparatus is able to determine whether the decoding of the transport block by the plurality of apparatuses excluding the first apparatus is successful includes:
    determining whether at least one apparatus among the plurality of apparatuses excluding the first apparatus transmits the HARQ NACK to the second apparatus through the PSFCH related to the PSSCH based on that the first apparatus does not transmit HARQ ACK to the second apparatus by succeeding to the decoding of the transport block, and based on that the first apparatus is able to determine whether the decoding of the transport block by the plurality of apparatuses excluding the first apparatus is successful; and
    determining the resources after the first resource as the candidate resource for the SL transmission of the first apparatus based on the successful decoding of the transport block by the first apparatus and based on that the at least one apparatus among the plurality of apparatuses excluding the first apparatus is determined not to transmit the HARQ NACK to the second apparatus through the PSFCH.

7. The method of claim 1, wherein a slot whose time resource overlaps with the plurality of resources is excluded from the candidate resource for the SL transmission of the first apparatus.

8. A method for performing sidelink (SL) communication by a third apparatus, the method including:
   receiving information on a plurality of resources from a second apparatus;
   determining whether a decoding of a transport block for a PSSCH by a fourth apparatus is successful based on a PSFCH related to the PSSCH transmitted from the second apparatus to the fourth apparatus on a first resource among the plurality of resources;
   determining whether to use resources after the first resource among the plurality of resources as a candidate resource for SL transmission by the third apparatus based on whether the decoding by the fourth apparatus is successful; and
   performing SL communication based on the determination related to whether to use the resources after the first resource as the candidate resource for the SL transmission by the third apparatus,
   wherein whether to use the resources after the first resource as the candidate resource is determined based on at least one of a congestion level, SL channel quality, service type or a QoS parameter related to a service.

9. The method of claim 8, wherein the determining whether the decoding of the transport block by the fourth apparatus is successful includes:
   determining that the decoding of the transport block by the fourth apparatus is successful based on receiving HARQ ACK from the fourth apparatus through the PSFCH.

10. The method of claim 9, wherein determining whether to use the resources after the first resource as the candidate resource for the SL transmission of the third apparatus includes:
    determining to use the resources after the first resource as the candidate resource for the SL transmission based on a measure reception power of the HARQ ACK being higher than a preconfigured threshold.

11. The method of claim 8, wherein the resources after the first resource, which are determined to be used as the candidate resource, are resources after a time point in which a time required for the third apparatus to process the HARQ feedback information elapsed from a time point in which the third apparatus received the HARQ feedback information from the fourth apparatus through the PSFCH or a time point expected to receive the HARQ feedback information.

12. The method of claim 8, wherein the determining whether the decoding of the transport block by the fourth apparatus is successful includes:
    determining that the decoding of the transport block by the fourth apparatus is successful based on not receiving HARQ NACK on a resource area for the PSFCH from the fourth apparatus.

13. A first apparatus for performing sidelink (SL) communication, the first apparatus including:
    at least one memory storing instructions;
    at least one transceiver; and
    at least one processor connecting the at least one memory and the at least one transceiver,
    wherein the at least one processor is configured to:
    control the at least one transceiver to receive information related to a plurality of resources from a second apparatus,
    control the at least one transceiver to receive a physical sidelink share channel (PSSCH) and a physical sidelink control channel (PSCCH) from the second apparatus on a first resource among the plurality of resources,
    determine resources after the first resource among the plurality of resources as a candidate resource for SL transmission by the first apparatus based on a successful decoding of a transport block received through the PSSCH, and
    perform SL communication based on the candidate resource for the SL transmission by the first apparatus,
    wherein the resources after the first resource determined as the candidate resource are resources after a a processing time required for the first apparatus to transmit hybrid automatic repeat request (HARQ) feedback information through a physical sidelink feedback channel (PSFCH) related to the PSSCH to the second apparatus has elapsed or processing of the HARQ feedback information is completed by the second apparatus after the second apparatus receives the HARQ feedback information.

* * * * *